(12) United States Patent
Dong et al.

(10) Patent No.: US 11,019,626 B2
(45) Date of Patent: May 25, 2021

(54) ALLOCATING VIRTUAL RESOURCE BLOCKS

(71) Applicant: HUAWEI TECHNOLOGIES CO., LTD., Guangdong (CN)

(72) Inventors: Chen Dong, Beijing (CN); Yongbo Zeng, Beijing (CN); Jian Wang, Beijing (CN); Lili Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 314 days.

(21) Appl. No.: 16/303,690

(22) PCT Filed: May 25, 2016

(86) PCT No.: PCT/CN2016/083235
§ 371 (c)(1),
(2) Date: Nov. 21, 2018

(87) PCT Pub. No.: WO2017/201680
PCT Pub. Date: Nov. 30, 2017

(65) Prior Publication Data
US 2020/0322952 A1   Oct. 8, 2020

(51) Int. Cl.
*H04L 12/28* (2006.01)
*H04W 72/04* (2009.01)
(Continued)

(52) U.S. Cl.
CPC ..... *H04W 72/0453* (2013.01); *H04W 72/085* (2013.01)

(58) Field of Classification Search
CPC .............. H04W 72/0453; H04W 72/1263
(Continued)

(56) References Cited

U.S. PATENT DOCUMENTS

2009/0073929 A1  3/2009  Malladi et al.
2009/0175230 A1  7/2009  Callard et al.
(Continued)

FOREIGN PATENT DOCUMENTS

CA      2955113 A1      2/2016
CN    101039297 A       9/2007
(Continued)

OTHER PUBLICATIONS

Office Action issued in Chinese Application No. 201680084748.1 dated Apr. 27, 2020, 6 pages (with English translation).
(Continued)

*Primary Examiner* — John Pezzlo
(74) *Attorney, Agent, or Firm* — Fish & Richardson P.C.

(57) ABSTRACT

The present invention discloses a method and an apparatus for data transmission. The method includes: determining a quantity N of first virtual resource blocks VRBs corresponding to first user equipment UE, where the N first VRBs correspond to N virtual subbands for carrying to-be-transmitted data of the first UE, and N is a natural number greater than or equal to 1; determining, based on the quantity N of the first VRBs, a first step corresponding to the N first VRBs, where the first step is used to indicate a distance between two adjacent physical subbands to which the N first VRBs are mapped in a physical resource, and the first step is greater than 1; and determining, based on the first step, N first PRBs corresponding to the N first VRBs, where the N first PRBs correspond to N physical subbands for carrying the to-be-transmitted data.

20 Claims, 5 Drawing Sheets

(51) Int. Cl.
*H04W 72/08* (2009.01)
*H04J 1/16* (2006.01)

(58) Field of Classification Search
USPC .................................. 370/252, 329, 430
See application file for complete search history.

(56) References Cited

U.S. PATENT DOCUMENTS

| | | | |
|---|---|---|---|
| 2010/0061345 A1* | 3/2010 | Wengerter | H04L 1/0046 |
| | | | 370/335 |
| 2012/0163310 A1 | 6/2012 | Baek et al. | |
| 2012/0287848 A1 | 11/2012 | Kim et al. | |
| 2013/0010685 A1 | 1/2013 | Kim et al. | |
| 2013/0250906 A1* | 9/2013 | Golitschek Edler von | |
| | | Elbwart | H04L 5/0037 |
| | | | 370/330 |
| 2013/0336259 A1 | 12/2013 | Awad et al. | |
| 2014/0146720 A1 | 5/2014 | Tang et al. | |
| 2015/0208406 A1 | 7/2015 | Seo et al. | |
| 2016/0234813 A1 | 8/2016 | Kim et al. | |

FOREIGN PATENT DOCUMENTS

| | | |
|---|---|---|
| CN | 101146317 A | 3/2008 |
| CN | 101170526 A | 4/2008 |
| CN | 101778394 A | 7/2010 |
| CN | 101779432 A | 7/2010 |
| CN | 102726109 A | 10/2012 |
| CN | 102870355 A | 1/2013 |
| CN | 102946640 A | 2/2013 |
| CN | 103259636 A | 8/2013 |
| EP | 0573417 B1 | 5/1997 |

OTHER PUBLICATIONS

Office Action issued in Chinese Application No. 201680084748.1 dated Nov. 27, 2019, 16 pages (with English translation).
3GPP TS 36.211 V12.6.0 (Jun. 2015), 3rd Generation Partnership Project;Technical Specification Group Radio Access Network;Evolved Universal Terrestrial Radio Access (E-UTRA);Physical channels and modulation(Release 12), Jun. 2015. total 136 pages.
Erik Dahlman et al. 4G LTE/LTE-Advanced for Mobile Broadband, Elsevier. 2014. total 447 pages.
Jin Hui:"LTE: Mapping between VRBs and PRBs", From the internet:"http://blog.sina.com.cn/s/blog_927cff010101canf.html". Apr. 2, 2013. total 25 pages. With English translation.
International Search Report and Written Opinion issued in International Application No. PCT/CN2016/083235 dated Feb. 21, 2017, 20 pages.
Extended European Search Report issued in European Application No. 16902670.5 dated Apr. 24, 2019, 7 pages.

* cited by examiner

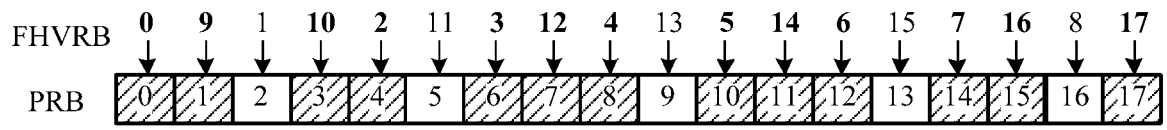

FIG. 7a

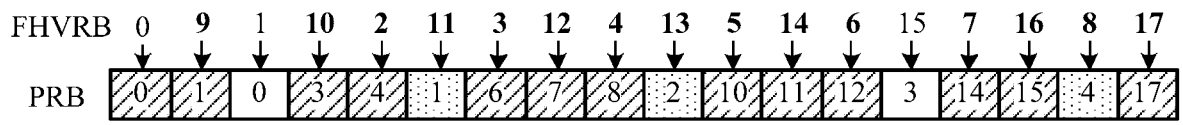

FIG. 7b

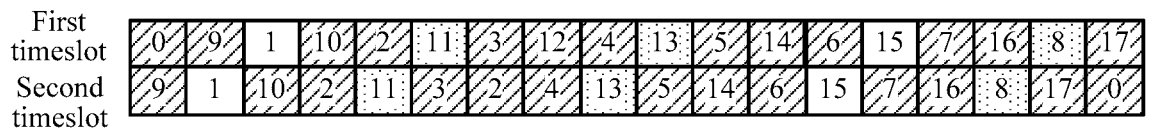

| Determine a mapping relationship between L VRBs and M PRBs based on a preset minimum frequency hopping distance | S210 |

| Determine N first PRBs corresponding to first UE. The N first PRBs correspond to N physical subbands for carrying to-be-transmitted data of the first UE | S220 |

| Determine, based on the mapping relationship and the N first PRBs, N first VRBs corresponding to the N first PRBs. The N first VRBs correspond to N virtual subbands for carrying the to-be-transmitted data | S230 |

FIG. 9

ALLOCATING VIRTUAL RESOURCE BLOCKS

TECHNICAL FIELD

Embodiments of the present invention relate to the communications field, and more specifically, to a method and an apparatus for data transmission.

BACKGROUND

In the prior art, when data is to be transmitted by using a channel, a resource needs to be allocated to the to-be-transmitted data. A process of resource allocation includes: allocating a virtual resource block (Virtual Resource Block, "VRB" for short) to the to-be-transmitted data, mapping the virtual resource block to a physical resource block (Physical Resource Block, "PRB" for short), and performing transmission by using the PRB.

Currently, a technology is known in which allocation of VRBs to to-be-transmitted data is not based on different users, and resources are sequentially allocated to all data from one or more users based on sequence numbers of the VRBs. In other words, VRBs to be allocated to the users are determined when a pattern of a mapping between VRBs and PRBs is determined.

However, when deep fading occurs in a channel, quality of signals received or sent in a frequency band in which the deep fading occurs is affected. If VRBs are allocated to to-be-transmitted data of a same user by using the foregoing resource allocation method, a plurality of VRBs carrying the data are consecutively distributed in PRBs. Consequently, the data may be affected in all the plurality of consecutive VRBs, and an error amount of the data is greatly increased, causing unsuccessful decoding of the data, in other words, affecting a transmission success rate.

SUMMARY

This application provides a method and an apparatus for data transmission, to reduce impact of channel fading on data transmission and improve a transmission success rate.

According to a first aspect, this application provides a method for data transmission. The method includes: determining a quantity N of first virtual resource blocks VRBs corresponding to first user equipment UE, where the N first VRBs correspond to N virtual subbands for carrying to-be-transmitted data of the first UE, and N is a natural number greater than or equal to 1; determining, based on the quantity N of the first VRBs, a first step corresponding to the N first VRBs, where the first step is used to indicate a distance between two adjacent physical subbands to which the N first VRBs are mapped in a physical resource, the first step is greater than 1, and there are at least two adjacent physical subbands whose distance is greater than 1 and to which the N first VRBs are mapped in the physical resource; and determining, based on the first step, N first PRBs corresponding to the N first VRBs, where the N first PRBs correspond to N physical subbands for carrying the to-be-transmitted data.

A first step of a corresponding first PRB in the physical resource is determined based on the quantity of the first VRBs corresponding to the first UE, and the first step is greater than 1. Further, first PRBs for carrying the to-be-transmitted data are determined, so that there are at least two adjacent first PRBs, whose distance is greater than 1, mapped in the physical resource, thereby dispersing the to-be-transmitted data of the first UE into the physical resource, to reduce impact of channel fading on data transmission and improve a transmission success rate.

With reference to the first aspect, in a first possible implementation of the first aspect, the determining, based on the quantity N of the first VRBs, a first step corresponding to the N first VRBs includes: determining M PRBs that can be used for data transmission, where M is a natural number greater than or equal to N, the M PRBs correspond to M PRB sequence numbers, the M PRB sequence numbers are sequentially arranged in an order from 0 to M−1 based on a step of 1, and the M PRB sequence numbers are used to consecutively indicate M physical subbands used by the M PRBs; and determining the first step based on a PRB sequence number of a PRB corresponding to a first first PRB in the N first PRBs and the quantity N of the first VRBs; or determining the first step based on a PRB sequence number of a PRB corresponding to a last first PRB in the N first PRBs and the quantity N of the first VRBs, where the N first PRBs correspond to the N first VRBs.

Optionally, the determining the first step based on a PRB sequence number of a PRB corresponding to a first first PRB in the N first PRBs and the quantity N of the first VRBs includes: determining that a PRB whose PRB sequence number is m in the M PRBs is the first first PRB in the N first PRBs, where m is a natural number greater than or equal to M−N; and determining, based on m and N, that a value range of the first step $W_1$ is $[1, (M-1-m)/(N-1)]$.

Further, the determining, based on the first step, N first PRBs corresponding to the N first VRBs includes: determining that a PRB sequence number of a PRB corresponding to an $i^{th}$ first PRB in the M PRBs is $N_i = m + [W_1 * (i-1)]$, where [ ] indicates rounding, and $i \in [1, N]$.

Optionally, the determining the first step based on a PRB sequence number of a PRB corresponding to a last first PRB in the N first PRBs and the quantity N of the first VRBs includes: determining that a PRB whose PRB sequence number is n in the M PRBs is the last first PRB in the N first PRBs, where n is a natural number greater than or equal to N; and determining, based on n and N, that a value range of the first step $W_1$ is $[1, n/(N-1)]$.

Further, the determining, based on the first step, N first PRBs corresponding to the N first VRBs includes: determining that a PRB sequence number of a PRB corresponding to an $i^{th}$ first PRB in the M PRBs is $N_i = n - [W_1 * (i-1)]$, where [ ] indicates rounding, and $i \in [1, N]$.

Locations of the N first PRBs in the M PRBs are determined based on a location of the first first PRB or the last first PRB in the N first PRBs in the M PRBs and the first step corresponding to the first UE, so that the first PRBs can be dispersed into the physical resource to a greatest extent. In other words, to-be-transmitted data of same UE is evenly dispersed into the physical resource, to reduce impact of channel fading on data transmission of single UE, so that impact of the channel fading on data transmission can be evenly dispersed into data transmission of a plurality of UEs. In other words, a bit error rate of a signal is evenly dispersed into uplink data of the plurality of UEs. In this way, a bit error rate of uplink data of each UE falls within a range of error correction, and the error correction is performed by using an existing error correction mechanism, so that decoding can be successfully performed, and the transmission success rate is finally improved.

With reference to the foregoing possible implementations of the first aspect, in a second possible implementation of the first aspect, the method further includes: determining a quantity S of second VRBs corresponding to second UE, where the S second VRBs correspond to S virtual subbands for carrying to-be-transmitted data of the second UE, S is a natural number greater than or equal to 1, and a sum of S and N is less than or equal to M; renumbering M−N PRBs other than the N first PRBs in the M PRBs, where the M−N PRBs correspond to M−N PRB sequence numbers, and the M−N PRB sequence numbers are sequentially arranged in an order from 0 to M−N−1 based on a step of 1; determining a second step corresponding to the S second VRBs, where the second step is used to indicate a distance between two adjacent physical subbands to which the S second VRBs are mapped in the physical resource, the second step is greater than 1, and there are at least two adjacent physical subbands whose distance is greater than 1 and to which the S second VRBs are mapped in the physical resource; and determining, based on the second step, a PRB sequence number of a PRB corresponding to the S second PRBs in the M−N PRBs.

The method for data transmission in this embodiment of the present invention is not limited to being used for one UE. The method in this embodiment of the present invention is also applicable to any UE performing uplink data transmission. Based on the foregoing method, a physical resource may be allocated to each UE, so that to-be-transmitted data of each UE can be evenly dispersed into the physical resource, thereby finally improving the transmission success rate.

With reference to the foregoing possible implementations of the first aspect, in a third possible implementation of the first aspect, the determining a quantity N of first VRBs corresponding to first UE includes: determining a quantity of VRBs corresponding to each of a plurality of UEs; determining the first UE from the plurality of UEs, where the first UE is UE having a largest quantity of VRBs in the plurality of UEs; and determining the quantity N of VRBs corresponding to the first UE.

The UE having the largest quantity of VRBs is determined as the first UE based on the quantity of VRBs corresponding to each UE. In other words, an order in which the base station allocates physical resources to the UEs is determined, and a resource is preferentially allocated to the UE having the largest quantity of VRBs. In this way, to-be-transmitted data of the UE can be more widely distributed in the physical resource when there are relatively more physical resources, helping to improve the transmission success rate.

With reference to the foregoing possible implementations of the first aspect, in a fourth possible implementation of the first aspect, the method further includes: determining a mapping relationship between L VRBs and the M PRBs based on a preset minimum frequency hopping distance, where the mapping relationship is used to indicate a location of each of the L VRBs in the M PRBs, the minimum frequency hopping distance is specifically a difference between VRB sequence numbers corresponding to any two consecutive PRB sequence numbers, the minimum frequency hopping distance is used to indicate a distance between virtual subbands used by VRBs corresponding to any two consecutive PRBs, M is a quantity of PRBs that can be used for data transmission, and L is a quantity of VRBs used for data transmission; and determining, based on the mapping relationship, VRB sequence numbers of the N first VRBs corresponding to PRB sequence numbers of the N first PRBs. The determining a mapping relationship between L VRBs and the M PRBs is performing frequency hopping processing on the L VRBs in the M PRBs. The frequency hopping processing herein is re-arranging the VRBs carried on the two consecutive PRBs, so that a distance between virtual subbands corresponding to VRBs carried on two adjacent PRBs is greater than or equal to the minimum frequency hopping distance. A VRB on which no frequency hopping processing is performed is distinguished from a VRB on which the frequency hopping processing is performed. The VRB on which the frequency hopping processing is performed is referred to as a frequency hopping VRB (FHVRB).

The frequency hopping processing is performed on VRBs, so that a correlation between data carried on adjacent PRBs is weakened, and impact of channel weakening on data transmission can be dispersed into two non-adjacent data segments to become random error codes. In this way, a burst error of a signal is discretized, to further help a system perform error correction processing on scattered single error codes, thereby further improving the transmission success rate.

Further, in a fifth possible implementation of the first aspect, the minimum frequency hopping distance is specifically set as follows: when L is an odd number, the minimum frequency hopping distance is $(L-1)/2$; or when L is an even number, the minimum frequency hopping distance is $L/2-1$.

Optionally, L PRBs corresponding to the L FHVRBs are consecutively arranged in the M PRBs, and L FHVRB sequence numbers corresponding to the L FHVRBs are arranged in an order from 0 to L−1 in the M PRBs as follows:

When L is an odd number, the FHVRB sequence numbers of the L FHVRBs are sequentially arranged in an order from 0 to $(L-1)/2$ based on a step of 1 at locations at which the PRB sequence numbers are even numbers, and sequentially arranged in an order from $(L+1)/2$ to L based on a step of 1 at locations at which the PRB sequence numbers are odd numbers. Alternatively, when L is an even number, the FHVRB sequence numbers of the L FHVRBs are sequentially arranged in an order from 0 to $L/2-1$ based on a step of 1 at locations at which the PRB sequence numbers are even numbers, and sequentially arranged in an order from $L/2$ to L based on a step of 1 at locations at which the PRB sequence numbers are odd numbers.

Specifically, when L is an odd number, the FHVRB sequence numbers of the L FHVRBs are sequentially arranged in an order of the PRB sequence numbers from 0 to L−1 as follows: 0, $(L+1)/2$, 1, $(L+1)/2+1$, ..., L−1, and $(L-1)/2$. When L is an even number, the FHVRB sequence numbers of the L FHVRBs are sequentially arranged in an order of the PRB sequence numbers from 0 to L−1 as follows: 0, $L/2$, 1, $L/2+1$, ..., $L/2-1$, and L. To be specific, the minimum frequency hopping distance is $L/2-1$.

It is experimentally proved that the minimum frequency hopping distance between the FHVRBs arranged in the foregoing manner is the largest. Therefore, two consecutive VRBs are dispersed into PRBs having a relatively large distance to a greatest extent, so that a correlation between data carried on adjacent PRBs can be weakened to the greatest extent.

With reference to the foregoing possible implementations of the first aspect, in a fifth possible implementation of the first aspect, the first VRB is a VRB transmitted by the first UE within a first time unit, and the method further includes: determining N fourth VRBs corresponding to the first UE that are used for transmission within a second time unit, where the N fourth VRBs are obtained by performing a cyclic shift on the N first VRBs, and the second time unit is a next time unit of the first time unit. Herein, the VRB may be a VRB on which no frequency hopping processing is performed, or may be a VRB on which the frequency hopping processing is performed.

The cyclic shift is performed on the VRBs within the second time unit adjacent to the first time unit, so that physical frequency bands used by the VRBs of the two adjacent time units can be staggered by at least one PRB. Because the channel fading may continue in time domain, the cyclic shift can be used to mitigate impact of sustained fading in a same physical subband on transmission of data carried in the physical subband.

According to a second aspect, this application provides a method for data transmission. The method includes: determining a mapping relationship between L virtual resource blocks VRBs and M physical resource blocks PRBs based on a preset minimum frequency hopping distance, where the mapping relationship is used to indicate a location of each of the L VRBs in the M PRBs, the minimum frequency hopping distance is specifically a difference between VRB sequence numbers corresponding to any two consecutive PRB sequence numbers, the minimum frequency hopping distance is used to indicate a distance between virtual subbands used by VRBs corresponding to any two consecutive PRBs, M is a quantity of PRBs that can be used for data transmission, L is a quantity of VRBs used for data transmission, the L VRBs correspond to L virtual subbands used for data transmission, and the M PRBs correspond to M physical subbands used for data transmission; determining N first PRBs corresponding to first user equipment UE, where the N first PRBs correspond to N physical subbands for carrying to-be-transmitted data of the first UE, and N is a natural number greater than or equal to 1; and determining, based on the mapping relationship and the N first PRBs, N first VRBs corresponding to the N first PRBs, where the N first VRBs correspond to N virtual subbands for carrying the to-be-transmitted data.

The determining a mapping relationship between L VRBs and M PRBs is performing frequency hopping processing on the L VRBs in the M PRBs. The frequency hopping processing herein is re-arranging the VRBs carried on the two consecutive PRBs, so that a distance between virtual subbands corresponding to VRBs carried on two adjacent PRBs is greater than or equal to the minimum frequency hopping distance. A VRB on which no frequency hopping processing is performed is distinguished from a VRB on which the frequency hopping processing is performed. The VRB on which the frequency hopping processing is performed is referred to as a frequency hopping VRB (FHVRB).

The frequency hopping processing is performed on VRBs, so that a correlation between data carried on adjacent PRBs is weakened, and impact of channel weakening on data transmission can be dispersed into two non-adjacent data segments to become random error codes. In this way, a burst error of a signal is discretized, to further help a system perform error correction processing on scattered single error codes, thereby further improving the transmission success rate.

Further, the minimum frequency hopping distance is specifically set as follows: when L is an odd number, the minimum frequency hopping distance is $(L-1)/2$; or when L is an even number, the minimum frequency hopping distance is $L/2-1$.

Optionally, L PRBs corresponding to the L FHVRBs are consecutively arranged in the M PRBs, and L FHVRB sequence numbers corresponding to the L FHVRBs are arranged in an order from 0 to L−1 in the M PRBs as follows:

When L is an odd number, the FHVRB sequence numbers of the L FHVRBs are sequentially arranged in an order from 0 to $(L-1)/2$ based on a step of 1 at locations at which the PRB sequence numbers are even numbers, and sequentially arranged in an order from $(L+1)/2$ to L based on a step of 1 at locations at which the PRB sequence numbers are odd numbers. Alternatively, when L is an even number, the FHVRB sequence numbers of the L FHVRBs are sequentially arranged in an order from 0 to $L/2-1$ based on a step of 1 at locations at which the PRB sequence numbers are even numbers, and sequentially arranged in an order from $L/2$ to L based on a step of 1 at locations at which the PRB sequence numbers are odd numbers.

Specifically, when L is an odd number, the FHVRB sequence numbers of the L FHVRBs are sequentially arranged in an order of the PRB sequence numbers from 0 to L−1 as follows: 0, $(L+1)/2$, 1, $(L+1)/2+1$, ..., L−1, and $(L-1)/2$. When L is an even number, the FHVRB sequence numbers of the L FHVRBs are sequentially arranged in an order of the PRB sequence numbers from 0 to L−1 as follows: 0, $L/2$, 1, $L/2+1$, ..., $L/2-1$, and L. To be specific, the minimum frequency hopping distance is $L/2-1$.

It is experimentally proved that the minimum frequency hopping distance between the FHVRBs arranged in the foregoing manner is the largest. Therefore, two consecutive VRBs are dispersed into PRBs having a relatively large distance to a greatest extent, so that a correlation between data carried on adjacent PRBs can be weakened to the greatest extent.

According to a third aspect, this application provides an apparatus for data transmission. The apparatus for data transmission is configured to perform the method according to any one of the first aspect or any possible implementation of the first aspect. Specifically, the apparatus includes a module that is configured to perform the method according to any one of the first aspect or any possible implementation of the first aspect.

According to a fourth aspect, this application provides an apparatus for data transmission. The apparatus for data transmission is configured to perform the method according to any one of the second aspect or any possible implementation of the second aspect. Specifically, the apparatus includes a module that is configured to perform the method according to any one of the second aspect or any possible implementation of the second aspect.

According to a fifth aspect, this application provides a device for data transmission. The device includes a transceiver, a memory, a processor, and a bus system. The transceiver, the memory, and the processor are connected to each other by using the bus system. The memory is configured to store an instruction. The processor is configured to execute the instruction stored in the memory, to control the transceiver to receive or send a signal. In addition, when the processor executes the instruction stored in the memory, the execution causes the processor to perform the method according to any one of the first aspect or any possible implementation of the first aspect.

According to a sixth aspect, this application provides a device for data transmission. The device includes a transceiver, a memory, a processor, and a bus system. The transceiver, the memory, and the processor are connected to each other by using the bus system. The memory is configured to store an instruction. The processor is configured to execute the instruction stored in the memory, to control the transceiver to receive or send a signal. In addition, when the processor executes the instruction stored in the memory, the execution causes the processor to perform the method according to any one of the second aspect or any possible implementation of the second aspect.

According to a seventh aspect, this application provides a computer-readable medium, configured to store a computer program. The computer program includes an instruction for performing the method according to any one of the first aspect or any possible implementation of the first aspect.

According to an eighth aspect, this application provides a computer-readable medium, configured to store a computer program. The computer program includes an instruction for performing the method according to any one of the second aspect or any possible implementation of the second aspect.

This application provides the method and the apparatus for data transmission, so that the impact of channel fading on data transmission can be reduced, and the transmission success rate can be improved.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 7a is a schematic diagram showing that a base station allocates a resource to first UE according to still another embodiment of the present invention;

FIG. 7b is a schematic diagram showing that a base station allocates a resource to second UE according to still another embodiment of the present invention;

FIG. 8 is a schematic diagram of a cyclic shift according to still another embodiment of the present invention;

FIG. 9 is a schematic flowchart of a method for data transmission according to yet another embodiment of the present invention;

DESCRIPTION OF EMBODIMENTS

Figure 1:
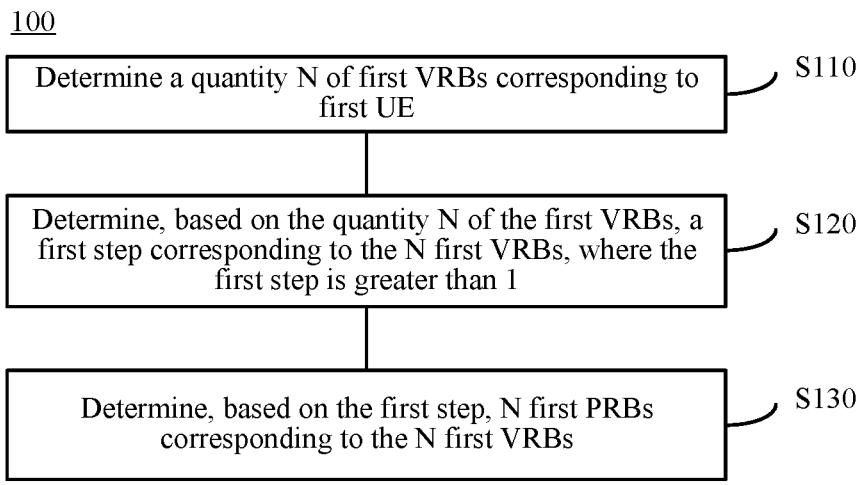
FIG. 1 is a schematic flowchart of a method for data transmission according to an embodiment of the present invention.

The following clearly and completely describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

It should be understood that the technical solutions of the present invention may be applied to various communications systems, such as: a Global System for Mobile Communications (Global System of Mobile communication, GSM), a Code Division Multiple Access (Code Division Multiple Access, CDMA) system, a Wideband Code Division Multiple Access (Wideband Code Division Multiple Access Wireless, WCDMA) system, a general packet radio service (General Packet Radio Service, GPRS), a Long Term Evolution (Long Term Evolution, LTE) system, a Long Term Evolution Advanced (Advanced long term evolution, LTE-A) system, and a Universal Mobile Telecommunications System (Universal Mobile Telecommunication System, UMTS).

It should further be understood that in the embodiments of the present invention, user equipment (UE, User Equipment) includes but is not limited to a mobile station (MS, Mobile Station), a mobile terminal (Mobile Terminal), a mobile telephone (Mobile Telephone), a handset (handset), a fixed station (Fixed Station), a fixed terminal (Fixed Terminal), portable equipment (portable equipment), and the like. The user equipment may communicate with one or more core networks by using a radio access network (RAN, Radio Access Network). For example, the user equipment may be a mobile telephone (or referred to as a "cellular" telephone), or a computer having a wireless communication function; the user equipment may further be a portable, pocket-sized, handheld, computer built-in, instrument built-in, or in-vehicle mobile apparatus.

The following describes in detail a method for data transmission according to the embodiments of the present invention with reference to FIG. 1 to FIG. 9.

It should be understood that, when UE needs to transmit data upstream, the UE needs to send information about the to-be-transmitted data to a base station. The base station configures an uplink transmission resource for the UE based on the information about the to-be-transmitted data, and then notifies, by using scheduling information, the UE of the resource configured for the UE, so that the UE transmits data upstreambased on the scheduling information by using the resource configured by the base station for the UE.

Specifically, the UE first determines, based on a size of the to-be-transmitted uplink data, a quantity of VRBs used for transmitting the uplink data, and then notifies the base station of the quantity. In a process in which the base station configures the uplink transmission resource for the UE, the base station allocates corresponding PRBs to the UE based on the quantity of the VRBs, for transmitting the uplink data.

Herein, the VRB and the PRB may be separately understood as follows: The VRB may be a virtual resource block that is used for carrying to-be-transmitted uplink data. The PRB may be a time-frequency resource that is actually used for transmitting uplink data in a physical resource. In other words, the UE only determines VRBs in which the uplink data can be carried, but does not allocate any physical resource to the VRBs. Time-frequency resources on which the VRBs are to be specifically transmitted need to be determined by the base station. The determining of the PRBs by the base station is determining of the time-frequency resources on which the uplink data is to be transmitted. In other words, the base station determines to map the VRBs for carrying the uplink data to the time-frequency resources corresponding to the PRBs.

However, because a channel may fade in consecutive timeslots (slot) or in a spectrum range, data transmission on the fading channel seriously affects a bit error rate of a signal. If uplink data of particular UE is transmitted on the fading channel, a bit error rate of the data is extremely high and encoding cannot be successfully performed. Therefore, a mechanism that can dispersedly add uplink data of same UE to allocated physical resources is desired, so that a bit error rate of a signal is evenly dispersed into uplink data of a plurality of UEs. In this way, a bit error rate of uplink data of each UE falls within a range of error correction, and the error correction is performed by using an existing error correction mechanism, so that decoding is successful.

FIG. 1 is a schematic flowchart of a method for data transmission 100 according to an embodiment of the present invention. The method shown in FIG. 1 may be performed by a base station or a network device. This is not particularly limited in the present invention. It should be understood that FIG. 1 shows detailed communication steps or operations of the method for data transmission according to this embodiment of the present invention from a perspective of the base station. However, these steps or operations are merely examples. Other operations or variations of the operations in FIG. 1 may further be performed in this embodiment of the present invention. In addition, the steps in FIG. 1 may be performed in an order different from that presented in FIG. 1, and the operations in FIG. 1 may not necessarily be all performed.

The following describes specific steps of FIG. 1.

S110. Determine a quantity N of first virtual resource blocks VRBs corresponding to first user equipment UE.

Specifically, the base station may receive an uplink data transmission request message sent by UE. The uplink data transmission request message may carry a quantity of VRBs corresponding to uplink data to be transmitted by each UE, to request the base station to allocate a corresponding physical resource to the UE.

In this embodiment of the present invention, without loss of generality, the base station may determine, based on an uplink data transmission request message sent by the first UE, the quantity N of the first VRBs (where for ease of understanding and distinguishing, VRBs corresponding to the first UE are referred to as first VRBs) corresponding to the first UE. In other words, the N first VRBs include N virtual subbands for carrying to-be-transmitted data of the first UE. In other words, the N first VRBs carry the to-be-transmitted data of the first UE by using the N virtual subbands. N is a natural number greater than or equal to 1.

S120. Determine, based on the quantity N of the first VRBs, a first step corresponding to the N first VRBs, where the first step is greater than 1.

S130. Determine, based on the first step, N first PRBs corresponding to the N first VRBs.

The base station allocates the N first PRBs corresponding to the N first VRBs to the first UE. The N first PRBs include N physical subbands for carrying the to-be-transmitted data. In other words, the N first PRBs carry the to-be-transmitted data by using the N physical subbands.

Specifically, the base station may determine, based on the quantity N of the first VRBs, a distance (namely, an example of the first step) between two adjacent first PRBs in the N first PRBs (where for ease of understanding and distinguishing, PRBs corresponding to the first VRB are referred to as first PRBs) to which the N first VRBs are mapped in the physical resource. In other words, the first step is used to indicate a distance between two adjacent physical subbands to which the N first VRBs are mapped in the physical resource. In addition, there are at least two physical subbands the distance between which is greater than 1 and to which the N first VRBs are mapped in the physical resource. For example, assuming that a quantity of PRBs that can be used for data transmission is M, where M is a natural number greater than or equal to N, it may be determined that the first step is M/N. The base station may further determine locations of the N first PRBs in the physical resource based on the first step.

It should be noted that, that the first step is used to indicate a distance between two adjacent physical subbands to which the N first VRBs are mapped in the physical resource does not mean that a value of the first step is the distance between the two adjacent physical subbands to which the N first VRBs are mapped in the physical resource. Because the value M/N of the first step may be a decimal number, rounding needs to be performed on M/N (where the rounding of the first step is described in detail below). Therefore, when the first step M/N is a decimal number, the value of the first step is not equal to the distance between the two adjacent physical subbands to which the N first VRBs are mapped in the physical resource.

It should be noted that, that the base station determines a distance between two adjacent first PRBs based on N does not mean that the base station already determines locations of the first PRBs. This should not constitute any limitation on the present invention. In this embodiment of the present invention, the base station determines only the first step based on N, and then determines locations of the first PRBs based on the first step.

Similarly, that the base station determines, based on the first step, N first PRBs corresponding to the N first VRBs does not mean that the base station already determines locations of the first VRBs. This should not constitute any limitation on the present invention. In this embodiment of the present invention, the base station determines only the quantity of the first VRBs, and then determines, based on the quantity and the first step, first PRBs corresponding to the first VRBs, or in other words, determines arrangement of first PRBs in the physical resource.

Therefore, according to the method for data transmission in this embodiment of the present invention, a first step of a corresponding first PRB in the physical resource is determined based on the quantity of the first VRBs corresponding to the first UE, and the first step is greater than 1. Further, first PRBs for carrying the to-be-transmitted data are determined, so that there are at least two adjacent first PRBs, the distance between which is greater than 1, mapped in the physical resource, thereby dispersing the to-be-transmitted data of the first UE into the physical resource, to reduce impact of channel fading on data transmission and improve a transmission success rate.

Optionally, the determining, based on the quantity N of the first VRBs, a first step corresponding to the N first VRBs includes:

determining M PRBs that can be used for data transmission, where M is a natural number greater than or equal to N, the M PRBs correspond to M PRB sequence numbers, the M PRB sequence numbers are sequentially arranged in an order from 0 to M−1 based on a step of 1, and the M PRB sequence numbers are used to consecutively indicate M physical subbands used by the M PRBs; and determining the first step based on a PRB sequence number of a PRB corresponding to a first first PRB in the N first PRBs and the quantity N of the first VRBs; or determining the first step based on a PRB sequence number of a PRB corresponding to a last first PRB in the N first PRBs and the quantity N of the first VRBs, where the N first PRBs correspond to the N first VRBs.

Specifically, the base station may first determine a quantity M of PRBs used for data transmission within a current time period (for example, a first time unit). In this embodiment of the present invention, the M PRBs may be in a one-to-one correspondence to the M PRB sequence numbers. The M PRB sequence numbers are sequentially arranged in an order from 0 to M−1 based on a step of 1, to consecutively indicate physical resources corresponding to the M PRBs. To be specific, PRB sequence numbers corresponding to the M PRBs are 0, 1, 2, 3, . . . , and M−1.

It should be understood that, the PRB sequence number is used to indicate a location of each PRB in the physical resource. Correspondingly, a VRB sequence number may be used to indicate a location of each VRB in a virtual resource. In other words, in the physical resource, the PRBs are consecutively arranged in an order of sequence numbers from 0 to M−1. In the virtual resource, the VRBs may also be consecutively arranged in an order of sequence numbers from 0 to L−1 based on resources allocated by the base station.

It should be further understood that the arrangement manner of the M PRB sequence numbers described herein is merely an example of description, and should not constitute any limitation on the present invention. The M PRB sequence numbers may also be arranged according to another predefined rule. This is not particularly limited in the present invention. Any case in which each PRB is used to uniquely indicate one PRB resource falls within the protection scope of the present invention.

It should be understood that, a manner of uniquely indicating a PRB by using a PRB sequence number is merely an example of description and should not constitute any limitation on the present invention, and the present invention should not be limited thereto. Any other manner of uniquely indicating a PRB falls within the protection scope of the present invention.

It should be noted that in this embodiment of the present invention, for ease of description, it is assumed that M is a natural number greater than or equal to N. In an actual resource allocation process, M may be a natural number greater than or equal to N, or may be a natural number less than N. Specifically, when M is less than N, the base station may directly allocate the M PRBs to the first VRB. In other words, the M PRBs are all used for the first UE. In addition, a first PRB continues to be allocated to the first VRB within a next time period (for example, a second time unit). When M is equal to N, the first step is 1, and the base station may directly allocate the M PRBs to the first VRB.

In other words, the M PRBs are all used for the first UE. When M is greater than N, the base station may determine the N first PRBs in the M PRBs based on the first step M/N.

In other words, in the present invention, when there are a relatively large quantity of physical resources used for allocation, a step corresponding to a quantity of VRBs of UE can be set to disperse a plurality of VRBs of same UE into the physical resources. When a relatively small quantity of physical resources are used for allocation, the prior art may be considered to directly allocate the physical resources to UE. Unless otherwise specified, M is a natural number greater than or equal to N. To be specific, the first step is a minimum of 1.

It should be noted that the time unit herein may be a timeslot (slot) or a subframe. This is not particularly limited in the present invention. The first time unit may be a first timeslot, the second time unit may be a second timeslot, and the second timeslot is a next timeslot of the first timeslot. Alternatively, the first time unit may be a first subframe, the second time unit may be a second subframe, and the second subframe is a next subframe of the first subframe.

Subsequently, the base station may determine a start location or an end location of the N first PRBs in the M PRBs. Specifically, the base station may determine the PRB sequence number of the PRB corresponding to the first first PRB in the M PRBs, or the PRB sequence number of the PRB corresponding to the last first PRB in the M PRBs.

The base station may determine, based on the start location or the end location of the N first PRBs and the quantity N of the first PRBs, the first step corresponding to the first VRB. In other words, after determining the M PRBs and N, the base station may further determine, based on the start location or the end location of the N first PRBs, that a maximum value of the first step thereof at least needs to meet that all the N first PRBs are allocated to the M PRBs. In this way, an upper limit of the first step can be determined.

In an embodiment, the determining the first step based on a PRB sequence number of a PRB corresponding to a first first PRB in the N first PRBs and the quantity N of the first VRBs includes:

determining that a PRB whose PRB sequence number is m in the M PRBs is the first first PRB in the N first PRBs, where m is a natural number greater than or equal to M−N; and determining, based on m and N, that a value range of the first step $W_1$ is $[1, (M-1-m)/(N-1)]$.

Further, the determining, based on the first step, N first PRBs corresponding to the N first VRBs includes:

determining that a PRB sequence number corresponding to an $i^{th}$ first PRB in the M PRBs is $N_i = m + [W_1 * (i-1)]$, where [ ] indicates rounding, and $i \in [1, N]$.

In another embodiment, the determining the first step based on a PRB sequence number of a PRB corresponding to a last first PRB in the N first PRBs and the quantity N of the first VRBs includes:

determining that a PRB whose PRB sequence number is n in the M PRBs is the last first PRB in the N first PRBs, where n is a natural number greater than or equal to N; and determining that a value range of the first step $W_1$ is $[1, n/(N-1)]$.

Further, the determining, based on the first step, N first PRBs corresponding to the N first VRBs includes:

determining that a PRB sequence number corresponding to an $i^{th}$ first PRB in the M PRBs is $N_i = n - [W_1 * (i-1)]$, where [ ] indicates rounding, and $i \in [1, N]$.

In other words, the base station may allocate resources to the N first VRBs in ascending order of PRB sequence numbers or in descending order of PRB sequence numbers. To be specific, as shown in FIG. 2a or FIG. 2b, allocation may be performed for the N first VRBs from left to right or from right to left.

Figure 2A:
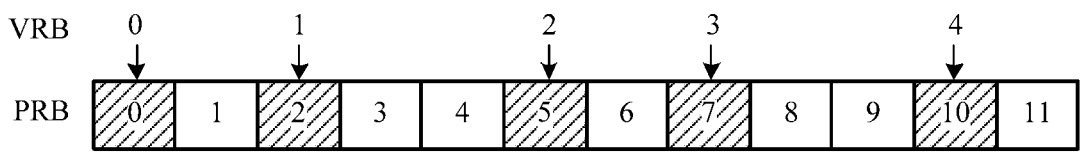
FIG. 2a is a schematic diagram showing that a base station allocates a resource to first UE according to an embodiment of the present invention.
Figure 2B:
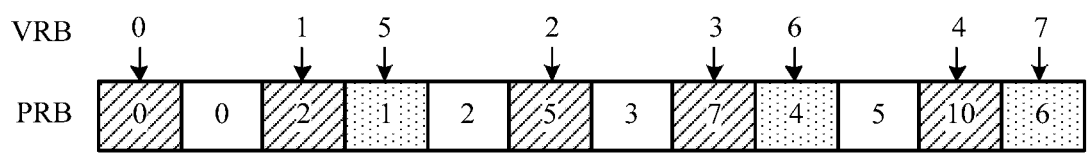
FIG. 2b is a schematic diagram showing that a base station allocates a resource to second UE according to an embodiment of the present invention.

It should be understood that, resources are divided by using a horizontal axis as a frequency domain direction for PRBs shown in FIG. 2a or FIG. 2b, or resources may be allocated to PRBs by using a vertical axis as a frequency domain direction. In this case, the base station may allocate PRB resources to the N first VRBs in a top-down or bottom-up order.

For ease of understanding and description below, unless otherwise specified, a left-to-right direction is referred to as a first direction, and a right-to-left direction is referred to as a second direction. It should be understood that, the first direction and the second direction are merely assumed directions for ease of understanding and description and should not constitute any limitation on the present invention. When the resources are allocated to the PRBs by using the vertical axis as the frequency domain direction, the first direction may be a top-down direction and the second direction may be a bottom-up direction. This is not particularly limited in the present invention.

It should be noted that, the "first UE", "first VRB", "first PRB", and "first step" herein are terms used for ease of understanding and description. "First" is used merely for indicating the UE, VRB, PRB, and step, and should not constitute any limitation on quantities of UEs, VRBs, PRBs, and steps. In other words, the base station may allocate a resource to one UE from the M PRBs, or may allocate resources to a plurality of UEs. This is not particularly limited in the present invention. When receiving the uplink data transmission request message sent by the UE, the base station may determine a quantity of UEs to which resources need to be allocated within a current time unit, a quantity of VRBs to be used by each UE, and a quantity of PRBs to be allocated to each UE. A specific method for determining, by the base station based on the uplink data transmission request message sent by the UE, a quantity of UEs to which resources are to be allocated is similar to the implementation in the prior art. For brevity, details are not described herein again.

This embodiment of the present invention is different from the prior art in which the base station does not distinguish between UEs, but centrally allocates resources to a plurality of UEs after receiving uplink data transmission request messages from the plurality of UEs. Because the UEs are not distinguished during resource allocation, a plurality of PRBs corresponding to same UE may be consecutively distributed. This is adverse to resistance to deep channel fading.

Correspondingly, according to the method for data transmission in this embodiment of the present invention, a step can be determined based on a quantity of VRBs of each UE, and PRB resources are allocated based on the step, so that there are at least two adjacent PRBs whose distance is greater than 1 and that are mapped in the physical resource, and PRBs corresponding to same UE can be dispersed into the physical resource, thereby helping to resist deep channel fading.

Subsequently, the base station determines the N first PRBs in the M PRBs, that is, determines a location of each of the N first PRBs in the physical resource, or in other words, a time-frequency resource corresponding to each first PRB.

The base station may determine locations of remaining N−1 first PRBs in the M PRBs based on a location of the first (or the last) of the N first PRBs in the M PRBs, and the first step corresponding to the first UE.

Specifically, after determining that the PRB sequence number of the PRB corresponding to the first of the N first PRBs in the M PRBs is m, or determining that the PRB sequence number of the PRB corresponding to the last of the N first PRBs in the M PRBs is n, the base station determines, based on the first step, PRB sequence numbers of PRBs corresponding to the remaining N−1 first PRBs in the M PRBs.

It should be noted that "first" and "last" are used merely for distinguishing and determining different directions of the N first PRBs (that is, determining the locations of the N first PRBs in the M PRBs). When the sequence number m or n is determined, a direction in which locations are allocated to the remaining N−1 first PRBs may be determined based on values of m and n. If m is a natural number less than or equal to M−N, it can be learned that when locations are allocated to remaining N−1 PRBs in the first direction, it can be ensured that all the N−1 PRBs are allocated to the M PRBs. However, if locations are allocated in the second direction, even if the first step is set to a minimum value 1, it cannot be ensured that all the N−1 PRBs are allocated to the M PRBs. Similarly, if n is a natural number greater than or equal to N, it can be learned that when locations are allocated to remaining N−1 PRBs in the second direction, it can be ensured that all the N−1 PRBs are allocated to the M PRBs. However, if locations are allocated in the first direction, even if the first step is set to a minimum value 1, it cannot be ensured that all the N−1 PRBs are allocated to the M PRBs. Therefore, when a sequence number of the first of the N first PRBs is determined, a direction in which the base station allocates locations to the N first PRBs may be determined. In other words, it can be determined whether the sequence number m or n belongs to the first or the last of the N first PRBs.

Further, after it is determined that the sequence number of the first first PRB in the M PRBs is m, it may be determined that locations of the remaining N−1 first PRBs are to be determined in the first direction, and further it is determined that a sequence number of each of the N first PRBs in the M PRBs is $N_i = m + [W_1 * (i-1)]$. To be specific, $N_1 = m$, $N_2 = m + [W_1]$, $N_3 = m + [W_1 * 2]$, $N_4 = m + [W_1 * 3]$, and $N_5 = m + [W_1 * 4]$.

Alternatively, after it is determined that the sequence number of the last first PRB in the M PRBs is n, it may be determined that locations of the remaining N−1 first PRBs are to be determined in the second direction, and further it is determined that a sequence number of each of the N first PRBs in the M PRBs is $N_i = n - [W_1 * (i-1)]$. To be specific, $N_1 = n$, $N_2 = n - [W_1]$, $N_3 = n - [W_1 * 2]$, $N_4 = n - [W_1 * 3]$, and $N_5 = n - [W_1 * 4]$.

A value of m may be 0, and a value of n may be M−1. In other words, the first of the N first PRBs may be a first of the M PRBs, and the last of the N first PRBs may be a last of the M PRBs. In this case, a value range of the first step $W_1$ is $[1, (M-1)/(N-1)]$. The N first PRBs are allocated to the first UE based on the foregoing parameters. The locations corresponding to the N first PRBs in the M PRBs are the most dispersed.

It should be noted that (M−1)/(N−1) may be divisible or indivisible. When (M−1)/(N−1) is divisible, the base station directly determines the first PRB based on a value of (M−1)/(N−1). When (M−1)/(N−1) is indivisible, when the base station determines each PRB other than the first first PRB in the N first PRBs, the base station may perform rounding when allocating a resource to each PRB. A detailed process in which the base station determines the N first PRBs is described in detail below with reference to the accompanying drawings.

Still further, this embodiment of the present invention is also applicable to a multiuser scenario. In this embodiment of the present invention, when resources need to be allocated to a plurality of UEs within a same time unit, the base station may sequentially allocate resources to the UEs in a sequence of received uplink data transmission request messages sent by the UEs, or may sort to-be-transmitted data of the UEs based on sizes of the to-be-transmitted data, and sequentially allocate resources to the UEs in descending order of data amounts.

It should be noted that the plurality of UEs described herein are UEs with a same priority. If there is at least one UE with a priority higher than priorities of other UEs in the plurality of UEs to which resources need to be allocated within a same time unit, a resource may be preferentially allocated to the UE with the highest priority. When the plurality of UEs have a same priority, resources may be allocated to the plurality of UEs by using the method for data transmission in this embodiment of the present invention.

Optionally, the determining a quantity N of first VRBs corresponding to first UE includes:

determining a quantity of VRBs corresponding to each of a plurality of UEs, where the plurality of UEs have a same priority;

determining the first UE from the plurality of UEs, where the first UE is UE having a largest quantity of VRBs in the plurality of UEs; and determining the quantity N of VRBs corresponding to the first UE.

As described above, the base station may sequentially allocate resources to the UEs based on VRB data corresponding to each UE. Specifically, the base station determines that UE with a largest quantity of VRBs is the first UE. In other words, a relationship between the quantity $Z_1$ of VRBs corresponding to the first UE and a quantity $Z_i$ ($i \neq 1$) of VRBs corresponding to the UEs other than the first UE in the foregoing plurality of UEs is $Z_1 \geq Z_i$. In other words, if two or more of the plurality of UEs have a same quantity of VRBs and each can be determined as the first UE, any one of the two or more UEs may be selected as the first UE, and then the process is cyclically performed.

For example, it is assumed that resources need to be allocated to three UEs (for example, UE #1, UE #2, and UE #3) within the current time unit, and quantities of VRBs corresponding to the UEs are respectively ($Z_1$, $Z_2$, and $Z_3$, and $Z_3 > Z_2 > Z_1$). When the three UEs have a same priority, the base station first allocates a resource to the UE #3, followed by the UE #2, and finally the UE #1.

For another example, the quantities of the VRBs corresponding to the UEs are respectively ($Z_1$, $Z_2$, and $Z_3$, and $Z_3 = Z_2 > Z_1$). When the three UEs have a same priority, the base station may first allocate a resource to the UE #3, or may first allocate a resource to the UE #2, and allocate a resource to the UE #1 after allocating the resources to the UE #3 and the UE #2.

Optionally, the method 100 further includes:

determining a quantity S of second VRBs corresponding to second UE, where the S second VRBs correspond to S virtual subbands for carrying to-be-transmitted data of the second UE, S is a natural number greater than or equal to 1, and a sum of S and N is less than or equal to M;

renumbering M−N PRBs other than the N first PRBs in the M PRBs, where the M−N PRBs correspond to M−N PRB sequence numbers, and the M−N PRB sequence numbers are sequentially arranged in an order from 0 to M−N−1 based on a step of 1;

determining a second step corresponding to the S second VRBs, where the second step is used to indicate a distance between two adjacent physical subbands to which the S second VRBs are mapped in the physical resource, and the second step is greater than 1; and determining, based on the second step, a PRB sequence number of a PRB corresponding to the S second PRBs in the M−N PRBs.

In other words, if the UEs are sorted based on the quantities of VRBs corresponding to the UEs, the quantity S of the second VRBs (where for ease of understanding and distinguishing, a VRB corresponding to the second UE is referred to as a second VRB) corresponding to the second UE is less than or equal to the quantity N of the first VRBs corresponding to the first UE, but is not less than a quantity of VRBs corresponding to UE other than the first UE and the second UE in the foregoing plurality of UEs. In other words, after determining the first UE, the base station may determine the second UE based on the quantity of VRBs corresponding to each UE.

Therefore, according to the method for data transmission in this embodiment of the present invention, a second step of a corresponding second PRB in the physical resource is determined based on the quantity of the VRBs corresponding to the second UE, and the second step is greater than 1. Further, second PRBs for carrying the to-be-transmitted data are determined, so that there are at least two adjacent second PRBs, whose distance is greater than 1, mapped in the physical resource, thereby dispersing the to-be-transmitted data of the second UE into the physical resource, to reduce impact of channel fading on data transmission and improve a transmission success rate. Further, this embodiment of the present invention is applicable to a scenario of a plurality of UEs. A physical resource is allocated to each UE, so that to-be-transmitted data of each UE can be evenly dispersed into the physical resource, thereby finally improving the transmission success rate.

It should be understood that, "first" and "second" are terms based on a sequence in which the base station allocates resources to the UEs, and should not constitute any limitation on the present invention. "First" and "second" do not mean that the base station allocates resources to only two UEs. On the contrary, the base station may allocate resources to a plurality of UEs. When there is a relatively large quantity of UEs, first UE, second UE, or the like may still be determined in the plurality of UEs by using the foregoing method. The first UE may be construed as UE having a largest quantity of VRBs in the plurality of UEs. The second UE may be construed as UE whose quantity of VRBs is second only to that of the first UE in the plurality of UEs. For a plurality of UEs having a same priority, for example, three UEs (for example, the foregoing UE #1, UE #2, and UE #3), the UE #3 is the first UE in the three UEs, and the UE #2 is the second UE in the three UEs. However, after it is determined that the UE #3 is the first UE of the three UEs, the foregoing second UE changes to the first UE in the remaining two UEs, and the UE #1 is the second UE in the remaining two UEs.

The base station may allocate a resource to the second UE by using the foregoing method for allocating a resource to the first UE by the base station. For example, after allocating a resource to the first UE in the first direction, the base station allocates a resource to the second UE in the second direction. Alternatively, after allocating a resource to the first UE in the second direction, the base station allocates a resource to the second UE in the first direction. Alternatively, after allocating a resource to the first UE in the first direction, the base station allocates a resource to the second UE still in the first direction. Alternatively, after allocating a resource to the first UE in the second direction, the base station allocates a resource to the second UE still in the second direction. This is not particularly limited in the present invention.

Optionally, the method 100 further includes:

determining, based on a mapping relationship between L VRBs and the M PRBs, VRB sequence numbers of the N first VRBs corresponding to PRB sequence numbers of the N first PRBs.

In other words, after determining the locations of the N first PRBs corresponding to the first UE, the base station may further determine N VRBs corresponding to the N first PRBs, so that the UE performs uplink data transmission by using the N VRBs.

Specifically, the mapping relationship between the L VRBs and the M PRBs is used to indicate a location of each of the L VRBs in the M PRBs. L may be a natural number less than or equal to M. In other words, the L VRBs may corresponding to all or some of the M PRBs.

In this embodiment of the present invention, the base station may prestore a mapping relationship between VRBs and PRBs. The VRB sequence numbers of the N first VRBs may be determined based on the mapping relationship between VRBs and PRBs after the PRB sequence numbers of the N first PRBs are determined. In this way, a one-to-one correspondence is established between to-be-transmitted data, VRBs, and PRBs. After learning of sequence numbers of first VRBs used for uplink transmission, the first UE may map a corresponding data segment to a corresponding first VRB, and then map the data segment to a corresponding first PRB for uplink transmission.

The following describes in detail how a base station allocates resources to two UEs with reference to FIG. 2a and FIG. 2b.

In schematic diagrams showing that the base station allocates resources to the UEs in FIG. 2a and FIG. 2b, a value of a quantity M of PRBs used for data transmission is 12, a value of a quantity N of first PRBs corresponding to first UE is 5, and a value of a quantity S of second PRBs (where for ease of understanding and distinguishing, a PRB corresponding to a second VRB is referred to as a second PRB) corresponding to second UE is 3. In other words, five first PRBs and three second PRBs are to be determined in 12 PRBs. In other words, only PRBs (including the first PRBs and the second PRBs) corresponding to eight VRBs (including first VRBs and second VRBs) need to be determined.

FIG. 2a is a schematic diagram showing that a base station allocates a resource to first UE according to an embodiment of the present invention. Sequence numbers of PRBs are completely the same as those of VRBs shown in FIG. 2a. To be specific, M PRB sequence numbers are arranged in a first direction, and are specifically: 0, 1, 2, 3, ..., and M−1. Optionally, the base station may select some PRBs, for example, L PRBs, from M PRBs for data transmission. L is a natural number less than M. PRB sequence numbers corresponding to the L PRBs may be: 0, 1, 2, 3, ..., and L−1, or may be: 3, 4, 5, ..., and L+2, or the like. This is not particularly limited in the present invention. The L PRBs may be L consecutive or non-consecutive PRBs in the M PRBs.

In the following, for ease of description, unless otherwise specially stated, descriptions are all provided by using an example in which L is equal to M, and the M PRBs need to be sequentially arranged in an order from 0 to M−1 based on a step of 1. It should be understood that, that L is equal to M is merely an example for description, and should not constitute any limitation on the present invention.

First, five first PRBs are allocated to the first UE. A first of the five first PRBs may be a PRB whose PRB sequence number is 0 in the M PRBs. In other words, a value of m is 0.

Subsequently, it is determined that a value range of a first step $W_1$ corresponding to the first UE is [1, 11/4]. In this embodiment of the present invention, a value of the first step $W_1$ is determined to be 12/5=2.4.

Subsequently, a second to a fifth first PRBs are determined based on the first step and the PRB sequence number of the first first PRB. Specifically, a PRB sequence number of a PRB corresponding to the second first PRB in the M PRBs is [12/5*1]=2. A PRB sequence number of a PRB corresponding to the third first PRB in the M PRBs is [12/5*2]=5. A PRB sequence number of a PRB corresponding to the fourth first PRB in the M PRBs is [12/5*3]=7. A PRB sequence number of a PRB corresponding to the fifth first PRB in the M PRBs is [12/5*4]=10. In this way, PRB numbers of the PRBs corresponding to the five first PRBs in the M PRBs may be determined.

Alternatively, when PRB sequence numbers are not set, it may be determined that the first first PRB is a first of the M PRBs. The second first PRB is a $(1+[12/5*1]=3)^{rd}$ of the M PRBs. The third first PRB is a $(1+[12/5*2]=6)^{th}$ of the M PRBs. The fourth first PRB is an $(1+[12/5*3]=8)^{th}$ of the M PRBs. The fifth first PRB is a $(1+[12/5*4]=11)^{th}$ of the M PRBs.

In this embodiment of the present invention, the VRBs are used for consecutively carrying data of the UEs. In other words, VRB sequence numbers of the first VRBs corresponding to the first UE are: 0, 1, 2, 3, and 4, respectively corresponding to first PRBs whose PRB sequence numbers are 0, 2, 5, 7, and 10 in a physical resource. Because the first step is introduced in the process of determining the first PRBs, consecutive VRBs are allocated to non-consecutive physical subbands. It should be understood that, the foregoing rounding is merely an example of rounding, and should not constitute any limitation on the present invention. For example, the rounding may include rounding up or rounding down. This is not particularly limited in the present invention.

Optionally, the base station may select the last of the M PRBs as the last PRB of the N first PRBs, or select a PRB in a middle location from the M PRBs as the first or the last PRB of the N first PRBs.

For example, the base station may select a PRB whose PRB sequence number is 2 in FIG. 2a as the first of the N first PRBs. In this case, the value range of the first step $W_1$ is [1, 10/4]. To be specific, 10/4 is (11−2)/(5−1)=2.25. It is assumed that the value of the first step $W_1$ is 2.25. A PRB sequence number corresponding to the second first PRB is 2+[2.25]=4. A PRB sequence number corresponding to the third first PRB is 2+[2.25*2]=7. A PRB sequence number corresponding to the fourth first PRB is 2+[2.25*3]=9. A PRB sequence number corresponding to the fifth first PRB is 2+[2.25*4]=11. In other words, the PRB sequence numbers corresponding to the N first PRBs are: 2, 4, 7, 9, and 11.

It can be found through comparison that when the value of m is 0 and when the value of m is 2, the N first PRBs are dispersed into the M PRBs at different degrees. When the value of m is 0, the N first PRBs can be dispersed at a higher degree.

FIG. 2b is a schematic diagram showing that a base station allocates a resource to second UE according to an embodiment of the present invention.

After allocating resources to first UE, the base station renumbers remaining 12−5=7 PRBs. To be specific, the remaining seven PRBs are sequentially arranged in an order from 0 to 6 based on a step of 1, or the remaining seven PRBs are sequentially arranged in an order from 6 to 0 based on a step of 1. In other words, the remaining seven PRBs are sequentially arranged in a first direction or a second direction based on a step of 1. FIG. 2b shows a case in which the seven PRBs are sequentially arranged in the first direction based on the step of 1.

Subsequently, three second PRBs are allocated to three second VRBs corresponding to the second UE. A last of the three second PRBs may be a PRB whose PRB sequence number is M−N−1 (namely, 12−5−1=6) in M−N (or, remaining M−N) PRBs other than N first PRBs in M PRBs. In other words, a value of n is 6.

Subsequently, it is determined that a value range of a second step $W_2$ corresponding to the second UE is [1, 11/2]. In this embodiment of the present invention, a value of the second step $W_2$ is determined to be (12−5)/3=2.33.

Subsequently, a second second PRB and a third second PRB are determined based on the second step and the PRB sequence number of the last second PRB. Specifically, a PRB sequence number of a PRB corresponding to the second second PRB in the remaining M−N PRBs is 6−[2.33]=4. A PRB sequence number of a PRB corresponding to the third second PRB in the M−N PRBs is 6−[2.33*2]=1.

Alternatively, when PRB sequence numbers are not set, it may be determined that a first second PRB is a last of the M−N PRBs, namely, a seventh PRB. The second second PRB is a $(7-[2.33]=5)^{th}$ of the M−N PRBs. The third second PRB is a $(7-[2.33*2]=2)^{nd}$ of the M−N PRBs.

In this embodiment of the present invention, the VRBs are used for consecutively carrying data of the UEs. In other words, VRB sequence numbers of the second VRBs corresponding to the second UE are: 5, 6, and 7, respectively corresponding to second PRBs whose PRB sequence numbers are 1, 4, and 6 in a physical resource. Because the second step is introduced in the process of determining the second PRBs, consecutive VRBs are allocated to non-consecutive physical subbands. By analogy, when there is third UE, M−N−S (or, remaining M−N−S) PRBs other than the N first PRBs and the S second PRBs in the M PRBs may further be allocated to the third UE. In other words, resources are allocated based on a quantity of PRBs corresponding to the third UE.

It can be learned from the foregoing examples that a step in the physical resource is determined based on a quantity of pre-allocated PRBs, to further evenly disperse to-be-transmitted data of same UE into the physical resource, to reduce impact of channel fading on data transmission of single UE, so that impact of the channel fading on data transmission can be evenly dispersed into data transmission of a plurality of UEs. In other words, a bit error rate of a signal is evenly dispersed into uplink data of the plurality of UEs. In this way, a bit error rate of uplink data of each UE falls within a range of error correction, and the error correction is performed by using an existing error correction mechanism, so that decoding can be successfully performed, and the transmission success rate is finally improved.

However, only a case in which the to-be-transmitted data of each UE uses a relatively small quantity of VRBs is considered in the foregoing examples. Specifically, in other words, a case in which the quantity of the first VRBs corresponding to the first UE is less than or equal to M/2 is considered. When the quantity of the first VRBs is greater than M/2, even if first PRBs are evenly allocated based on the step, a case in which at least two first PRBs occupy at least two consecutive PRBs and even a case in which more first PRBs occupy consecutive PRBs occur.

If PRBs are allocated still by using the foregoing method, and channel fading occurs in a plurality of consecutive first PRB locations, the to-be-transmitted data of the first UE is affected, and a bit error rate of a data segment may be particularly high.

Therefore, a concept of frequency hopping is introduced in the present invention. The frequency hopping herein may be understood as follows: virtual resources corresponding to the VRBs carried on two consecutive PRBs are discontinuous. In other words, data carried on two consecutive PRBs is discontinuous. To be specific, an original to-be-transmitted data sequence is jumbled, so that a correlation of data carried on consecutive PRBs is weakened. This has the following advantage: impact of channel fading on data transmission can be dispersed into two non-adjacent data segments, becoming random bit errors. The essence is to discretize a burst error of a signal. A higher discretization degree of a burst error code indicates easier error correction processing performed by a system on scattered single error codes and a stronger protection capability against the burst error code.

Optionally, the method 100 further includes:

determining a mapping relationship between L VRBs and the M PRBs based on a preset minimum frequency hopping distance, where the mapping relationship is used to indicate a location of each of the L VRBs in the M PRBs, the minimum frequency hopping distance is specifically a difference between VRB sequence numbers corresponding to any two consecutive PRB sequence numbers, the minimum frequency hopping distance is used to indicate a distance between virtual subbands used by VRBs corresponding to any two consecutive PRBs, M is a quantity of PRBs that can be used for data transmission, and L is a quantity of VRBs used for data transmission; and determining, based on the mapping relationship, VRB sequence numbers of the N first VRBs corresponding to PRB sequence numbers of the N first PRBs.

In other words, the base station performs frequency hopping processing on the VRBs, to be specific, re-arranges the VRBs carried on the two consecutive PRBs, so that a distance between virtual subbands corresponding to VRBs carried on two adjacent PRBs is greater than or equal to the minimum frequency hopping distance. For example, a specific form of expression may be: a difference between sequence numbers of the VRBs carried on two adjacent PRBs is greater than or equal to a preset value. The preset value corresponds to the minimum frequency hopping distance.

It should be noted that the minimum frequency hopping distance is preset so that a VRB sequence that originally and consecutively carries data of same UE is jumbled. In other words, data from same UE is no longer carried by using consecutive VRBs. In other words, data carried by two VRBs whose sequence numbers are consecutive is discontinuous, or a correlation of the data is low, or the data even does not have any correlation.

In the following descriptions, for ease of understanding and distinguishing, a VRB on which frequency hopping processing is performed is referred to as a frequency hopping VRB (Frequency-Hopping VRB, "FHVRB" for short). It should be understood that an FHVRB is also a VRB, and is merely referred to as an FHVRB to be distinguished from the VRB on which no frequency hopping processing is performed in the prior art, and should not constitute any limitation on the present invention. The present invention also does not exclude a case in which the term VRB is still used after the frequency hopping processing is performed on the VRB, or a case in which another name is used. It should be further understood that, the frequency hopping processing is implemented in a process of mapping a VRB to a PRB. Therefore, no frequency hopping processing is performed on the VRB before mapping.

It should be noted that the quantity M of PRBs may be the same as or different from a quantity L of VRBs. Regardless of whether M is the same as or different from L, VRBs can be mapped according to the following rule. A difference is that when M is greater than or equal to L, the L VRBs may be all mapped to the M PRBs at a time, and when M is less than L, the L VRBs need to be mapped to PRBs by using at least two steps, or in other words, only some (for example, a maximum of M) of the L VRBs can be mapped to the M PRBs during one mapping.

In this embodiment of the present invention, the quantity L is determined based on a sum of a quantity of UEs that need to perform uplink data transmission within a current time unit and a quantity of VRBs corresponding to the UEs. For example, in the foregoing embodiment, within the current time unit, a total of two UEs (for example, the first UE and the second UE) need to perform uplink data transmission. The first UE corresponds to N first VRBs, and the second UE corresponds to S second VRBs. In this case, the quantity L is a natural number greater than or equal to N+S.

Figure 3:
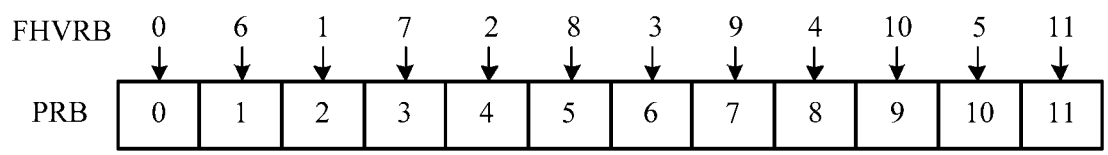
FIG. 3 is a schematic diagram of a pattern of a mapping between PRBs and FHVRBs according to another embodiment of the present invention.

For ease of description, the following describes in detail a mapping relationship between PRBs and FHVRBs with reference to FIG. 3 still by using an example in which M is equal to L.

FIG. 3 is a schematic diagram of a pattern of a mapping between PRBs and FHVRBs according to another embodiment of the present invention.

As shown in FIG. 3, L PRBs whose PRB sequence numbers are 0 to L−1 are in a one-to-one correspondence to L FHVRBs. Specifically, when L is an odd number, FHVRB sequence numbers of the L FHVRBs are sequentially arranged in an order of the PRB sequence numbers from 0 to L−1 as follows: 0, (L+1)/2, 1, (L+1)/2+1, . . . , L−1, and (L−1)/2. To be specific, the minimum frequency hopping distance is (L−1)/2. When L is an even number, the FHVRB sequence numbers of the L FHVRBs are sequentially arranged in an order of the PRB sequence numbers from 0 to L−1 as follows: 0, L/2, 1, L/2+1, . . . , L/2−1, and L. To be specific, the minimum frequency hopping distance is L/2−1.

As can be learned from this, when L is an odd number, the FHVRB sequence numbers of the L FHVRBs are sequentially and consecutively arranged in an order from 0 to (L−1)/2 based on a step of 1 at locations at which the PRB sequence numbers are even numbers, and sequentially and consecutively arranged in an order from (L+1)/2 to L based on a step of 1 at locations at which the PRB sequence numbers are odd numbers. Alternatively, when L is an even number, the FHVRB sequence numbers of the L FHVRBs are sequentially and consecutively arranged in an order from 0 to L/2−1 based on a step of 1 at locations at which the PRB sequence numbers are even numbers, and sequentially and consecutively arranged in an order from L/2 to L based on a step of 1 at locations at which the PRB sequence numbers are odd numbers.

FIG. 3 shows, by using M=L=12 as an example, a pattern of a mapping relationship when 12 FHVRBs are mapped to 12 PRBs. Based on the foregoing arrangement manner, it can be learned that FHVRB sequence numbers of the 12 FHVRBs consecutively arranged on the 12 PRBs are sequentially: 0, 6, 1, 7, 2, 8, 3, 9, 4, 10, 5, and 11. It can be learned that a minimum difference between two consecutive FHVRB sequence numbers of the foregoing 12 FHVRB sequence numbers is 5, to be specific, 12/2−1.

Figure 4:
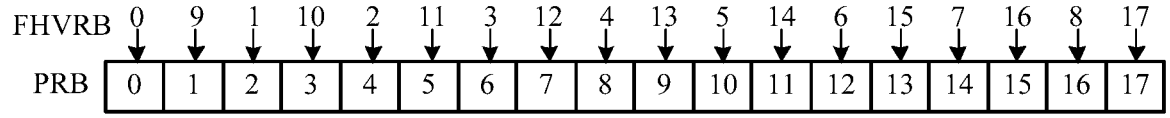
FIG. 4 is a schematic diagram of a pattern of a mapping between PRBs and FHVRBs according to still another embodiment of the present invention.

FIG. 4 is a schematic diagram of a pattern of a mapping between PRBs and FHVRBs according to still another embodiment of the present invention.

As shown in FIG. 4, M=L=18. To be specific, 18 FHVRBs are mapped to 18 PRBs. Based on the foregoing arrangement manner, it can be learned that sequence numbers of the 18 FHVRBs consecutively arranged on the 18 PRBs are sequentially: 0, 9, 1, 10, 2, 11, 3, 12, 4, 13, 5, 14, 6, 15, 7, 16, 8, and 17. It can be learned that a minimum difference between two consecutive FHVRB sequence numbers of the foregoing 18 FHVRB sequence numbers is 8, to be specific, 18/2−1.

It should be understood that, the mapping relationships between FHVRB sequence numbers and PRB sequence number described herein are merely examples of descriptions and should not constitute any limitation on the present invention.

Further, after determining the pattern of the mapping between FHVRBs and PRBs, a base station may allocate resources to a first FHVRB of first UE and a second FHVRB of second UE based on the foregoing resource allocation manner.

Figure 5A:
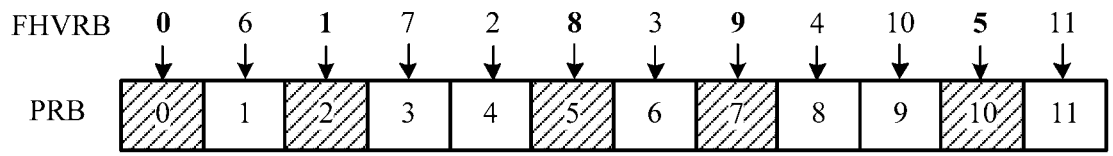
FIG. 5a is a schematic diagram showing that a base station allocates a resource to first UE according to another embodiment of the present invention.
Figure 5B:
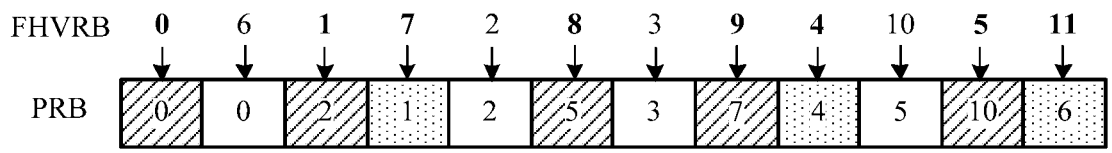
FIG. 5b is a schematic diagram showing that a base station allocates a resource to second UE according to another embodiment of the present invention.
Figure 5C:
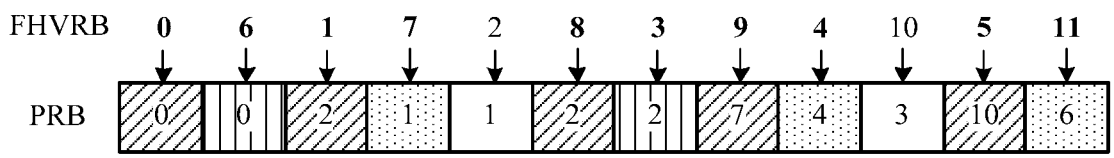
FIG. 5c is a schematic diagram showing that a base station allocates a resource to third UE according to another embodiment of the present invention.

The following describes in detail a schematic diagram of resource allocation according to an embodiment of the present invention with reference to FIG. 5 (including FIG. 5a to FIG. 5c) and FIG. 7 (including FIG. 7a and FIG. 7b).

FIG. 5a to FIG. 5c are schematic diagrams showing that a base station allocates a resource to first UE, second UE, and third UE respectively according to another embodiment of the present invention. A quantity M of PRBs that can be used for data transmission is 12, and a mapping relationship between FHVRBs and PRBs is shown in FIG. 3. A quantity N of first FHVRBs corresponding to the first UE is five. A quantity S of second FHVRBs corresponding to the second UE is three. A quantity T of fourth FHVRBs corresponding to the third UE is two.

FIG. 5a is a schematic diagram showing that a base station allocates a resource to first UE according to another embodiment of the present invention.

As shown in FIG. 5a, first, the base station determines a location of a first first PRB corresponding to a first first VRB. For example, a first PRB (namely, a PRB whose PRB sequence number is 0) of the 12 PRBs is used as the first first PRB. Subsequently, it is determined that a first step corresponding to the first UE is 12/5=2.4.

Subsequently, locations are determined based on the first step for four first PRBs corresponding to remaining four first VRBs. It can be learned from the foregoing descriptions (referring to FIG. 2a) that, a PRB sequence number of a second first PRB in the 12 PRBs is 2, a PRB sequence number of a third first PRB in the 12 PRBs is 5, a PRB sequence number of a fourth first PRB in the 12 PRBs is 7, and a PRB sequence number of a fifth first PRB in the 12 PRBs is 10.

It should be noted that, the first VRB herein may be an FHVRB on which frequency hopping processing is performed, or a VRB on which no frequency hopping processing is performed. In other words, the frequency hopping processing may be performed on the first VRB after the first PRB is determined, or before the first PRB is performed, or when the first PRB is being performed. This is not limited in the present invention.

Referring to FIG. 3 again, VRB sequence numbers of first FHVRBs for carrying to-be-transmitted data of the first UE may be determined based on a mapping relationship between FHVRBs and PRBs, and to be specific, are FHVRB sequence numbers of FHVRBs respectively corresponding to PRB sequence numbers 0, 2, 5, 7, and 10. It can be determined from FIG. 3 that FHVRB sequence numbers of the first FHVRBs are: 0, 1, 8, 9, and 5.

FIG. 5b is a schematic diagram showing that a base station allocates a resource to second UE according to another embodiment of the present invention. As shown in FIG. 5b, the base station first renumbers remaining seven PRBs. It can be learned from the figure that the numbers are sequentially 0, 1, 2, 3, 4, 5, and 6 from left to right.

Subsequently, a location is determined for a last second PRB corresponding to a last second VRB. For example, a last PRB (namely, a PRB whose PRB sequence number is 6 in the remaining seven PRBs) of the remaining seven PRBs is used as the last second PRB.

Subsequently, it is determined that a second step corresponding to the second UE is 7/3=2.33.

Subsequently, locations are determined based on the second step for two second PRBs corresponding to remaining two second VRBs. It can be learned from the foregoing description (referring to FIG. 2b) that, a PRB sequence number of a second second PRB in the seven PRBs is 4, and a PRB sequence number of a first second PRB in the seven PRBs is 1.

It should be noted that, the second VRB herein may be an FHVRB on which frequency hopping processing is performed, or a VRB on which no frequency hopping processing is performed. In other words, the frequency hopping processing may be performed on the second VRB after the second PRB is determined, or before the second PRB is performed, or when the second PRB is being performed. This is not limited in the present invention.

Referring to FIG. 3 again, FHVRB sequence numbers of second FHVRBs for carrying to-be-transmitted data of the second UE may be determined based on a mapping relationship between FHVRBs and PRBs, and to be specific, are FHVRB sequence numbers of FHVRBs respectively corresponding to PRB sequence numbers 6, 4, and 1. It can be determined from FIG. 3 that the FHVRB sequence numbers of the second FHVRBs are: 11, 4, and 7.

FIG. 5c is a schematic diagram showing that a base station allocates a resource to third UE according to another embodiment of the present invention. As shown in FIG. 5c, the base station first renumbers remaining four PRBs. It can be learned from the figure that the numbers are sequentially 0, 1, 2, and 3 from left to right.

Subsequently, a location is determined for a first third PRB (where for ease of understanding and distinguishing, a PRB corresponding to a third VRB is referred to as a third PRB) corresponding to a first third VRB (where for ease of understanding and distinguishing, a VRB corresponding to the third UE is referred to as the third VRB). For example, a first PRB (namely, a PRB whose PRB sequence number is 0 of remaining four PRBs) of the four PRBs is used as the first third PRB.

Subsequently, it is determined that a third step corresponding to the third UE is 4/2=2.

Subsequently, locations are determined based on the third step for two second PRBs corresponding to remaining two third VRBs. According to the foregoing method for determining a PRB for UE by a base station, it can be determined that a PRB sequence number of a second third PRB in the four PRBs is 2.

It should be noted that, the third VRB herein may be an FHVRB on which frequency hopping processing is performed, or a VRB on which no frequency hopping processing is performed. In other words, the frequency hopping processing may be performed on the third VRB after the third PRB is determined, or before the third PRB is performed, or when the third PRB is being performed. This is not limited in the present invention.

Referring to FIG. 3 again, VRB sequence numbers of third FHVRBs for carrying to-be-transmitted data of the third UE may be determined based on a mapping relationship between VRBs and PRBs, and to be specific, are VRB sequence numbers of FHVRBs respectively corresponding to PRB sequence numbers 6, 4, and 1. It can be determined from FIG. 3 that the VRB sequence numbers of the third FHVRBs are: 6, and 3.

In this way, locations that are of the first PRBs, the second PRBs, and the third PRBs in the M PRBs and that are allocated by the base station to the first UE, the second UE, and the third UE, and the FHVRB sequence numbers corresponding to the first FHVRBs, the second FHVRBs, and the third VRBs may be determined. It can be learned from FIG. 5c that the first PRBs, the second PRBs, and the third PRBs are evenly allocated in the M PRBs. Any two first PRBs, second PRBs, or third PRBs do not consecutively use resources of two PRBs.

It should be understood that, a sequence of performing the frequency hopping processing on the VRBs (for example, the first VRB, the second VRB, and the third VRB) and determining the PRBs (for example, the first PRB, the second PRB, and the third PRB) is not specified in the present invention. In addition, a sequence of performing the frequency hopping processing on VRBs of a plurality of UEs and determining PRBs corresponding to the UEs is not particularly specified in the present invention.

Herein, a concept of a maximum consecutive resource block quantity (the longest consecutive RBs from a single UE, "LCRB" for short) is introduced in the present invention. The maximum consecutive resource block quantity is used to indicate a quantity of consecutive resource blocks that are used for physical resources of a same user within a time unit. In other words, information of a same user is not distributed in a particular physical band in a concentrated manner. The maximum consecutive resource block quantity represents a quantity of consecutive physical subband for carrying to-be-transmitted data of a same user. It can be learned that in the embodiment shown in FIG. 5 (including FIG. 5a, FIG. 5b, and FIG. 5c), the maximum resource block quantity is one.

Further, the first VRB is a VRB transmitted by the first UE within a first time unit.

The method 100 further includes:

determining N first VRBs corresponding to the first UE that are used for transmission within a second time unit, where N second VRBs are obtained by performing a cyclic shift on the N first VRBs, and the second time unit is a next time unit of the first time unit.

Specifically, as specified in an existing 3GPP protocol, VRB sequence numbers of VRBs (including the foregoing VRBs on which no frequency hopping processing is performed and the foregoing VRBs (namely, the FHVRBs) on which the frequency hopping processing is performed) used by same UE in one subframe (namely, two adjacent timeslots) do not change. In other words, without loss of generality, VRB sequence numbers corresponding to first VRBs used for the first UE within the first time unit (for example, a first timeslot) remain unchanged within a next time unit (for example, a second timeslot). Herein, within the first time unit, a VRB corresponding to the first UE is referred to as a first VRB, a VRB corresponding to the second UE is referred to as a second VRB, a VRB corresponding to the third UE is referred to as a third VRB, a PRB corresponding to the first VRB is referred to as a first PRB, a PRB corresponding to the second VRB is referred to as a second PRB, and a PRB corresponding to the third VRB is referred to as a third PRB. Within the second time unit, a VRB corresponding to the first UE is referred to as a fourth VRB, and a PRB corresponding to the fourth VRB is referred to as a fourth PRB. Within the second time unit, N fourth VRBs are still used for data transmission of the first UE.

In this way, in two adjacent timeslots of a subframe, physical bands used by VRBs corresponding to same UE without a cyclic shift overlap. Channel fading not only occurs in frequency domain, but also may further occur in two consecutive timeslots (for example, the first timeslot and the second timeslot). Therefore, if channel fading occurs in a subband in the first timeslot, data carried in the physical subband is affected. If data of same UE is still carried in a same subband in a next timeslot (namely, the second timeslot), the data of the UE is seriously affected, causing a bit error rate to increase.

However, if the cyclic shift is performed on PRBs within the second time unit, physical subbands corresponding to two VRBs with a same VRB sequence number in the first timeslot and the second timeslot are caused not to overlap. In this way, impact of the channel fading on data transmission in a time domain direction can be mitigated to some extent.

It should be understood that, the example in which the timeslots are used as the time units described herein is merely an example of a description and should not constitute any limitation on the present invention. The time unit may also be another unit used for representing time. Any case falls within the protection scope of the present invention provided that two consecutive time units or more time units are used for data transmission of same UE and VRB sequence numbers used by the UE in the consecutive time units do not change.

It should be further understood that, N third VRBs corresponding to the first UE within the second time unit described herein are merely an example of a description and should not constitute any limitation on the present invention. Similar to the first UE, the second UE corresponds to S second VRBs within the first time unit, and corresponds to S fifth VRBs within the second time unit. The third UE corresponds to T third VRBs within the first time unit, and corresponds to T sixth VRBs within the second time unit.

Figure 6:
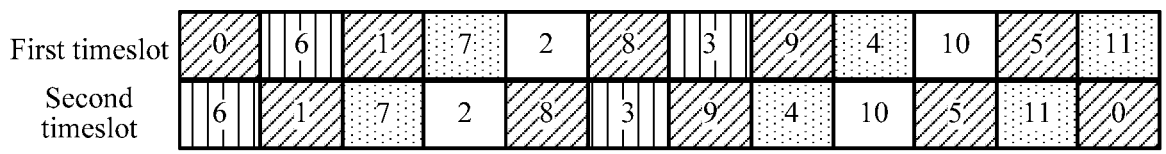
FIG. 6 is a schematic diagram of a cyclic shift according to another embodiment of the present invention.

FIG. 6 is a schematic diagram of a cyclic shift according to another embodiment of the present invention. For ease of understanding and description, VRB sequence numbers of VRBs corresponding to 12 PRBs are marked on the corresponding PRBs. As shown in FIG. 6, VRB sequence numbers of VRBs corresponding to the 12 PRBs in a first timeslot are shown in FIG. 3. In a second timeslot, the VRBs are cyclically shifted to the left by one PRB, to achieve a resource usage status shown in FIG. 6. It can be learned that in different physical subbands and different timeslots, at least one PRB is occupied by a VRB carrying data. It should be understood that a displacement amount of the cyclic shift may be one PRB or may be two PRBs, and a direction of the cyclic shift may be a first direction or a second direction. This is not limited in the present invention.

Herein, a concept of a diversity order (Diversity Order) is introduced in the present invention. The diversity order may be construed as a quantity of subbands occupied by data from a same user in two timeslots of one subframe.

In this way, the concepts of the diversity order, the maximum consecutive resource block quantity, and the minimum frequency hopping distance are introduced in the present invention. The following describes in detail with reference to FIG. 6 how to determine the three indexes.

First, the diversity order is determined. As shown in FIG. 6, in the first timeslot, FHVRB sequence numbers corresponding to five first FHVRBs corresponding to first UE are: 0, 1, 8, 9, and 5; FHVRB sequence numbers corresponding to three second FHVRBs corresponding to second UE are: 11, 4, and 1; and FHVRB sequence numbers corresponding to two third FHVRBs corresponding to third UE are: 6 and 3. It can be learned that, after being cyclically shifted by one PRB, FHVRBs (including the first FHVRBs and fourth FHVRBs) corresponding to the first UE occupy a total of 10 PRBs in the first timeslot and the second timeslot; FHVRBs (including the second FHVRB and fifth FHVRBs) corresponding to the second UE occupy a total of six PRBs in the first timeslot and the second timeslot; and FHVRBs (including the third FHVRBs and sixth FHVRBs) corresponding to the third UE occupy a total of four PRBs in the first timeslot and the second timeslot. To be specific, a diversity order of the first UE is 10, a diversity order of the second UE is 6, and a diversity order of the third UE is 4.

Subsequently, the maximum consecutive resource block quantity is determined. As shown in FIG. 6, in the first timeslot, first PRBs corresponding to the five first FHVRBs corresponding to the first UE are discontinuous in the 12 PRBs; second PRBs corresponding to the three second FHVRBs corresponding to the second UE are also discontinuous in the 12 PRBs; and third PRBs corresponding to the two second FHVRBs corresponding to the third UE are also discontinuous in the 12 PRBs. To be specific, in the first timeslot, a maximum consecutive resource block quantity of the first UE is one, a maximum consecutive resource block quantity of the second UE is one, and a maximum consecutive resource block quantity of the third UE is one. Similarly, in the second timeslot, the maximum consecutive resource block quantity of the first UE is also one, the maximum consecutive resource block quantity of the second UE is also one, and the maximum consecutive resource block quantity of the third UE is also one.

Subsequently, the minimum frequency hopping distance is determined. Herein, it should be noted that the minimum frequency hopping distance does not relate to the user, but relates only to a mapping relationship between FHVRBs and PRBs. It can be learned that a minimum frequency hopping distance of FHVRBs carried on PRBs shown in FIG. 6 is 5.

It can be learned by determining the foregoing three indexes that, according to the method for data transmission in the embodiments of the present invention, data of a plurality of UEs can be evenly allocated to a physical resource, so that a correlation of data carried on consecutive PRBs is weakened, thereby dispersing channel fading into the data of the UEs, and discretizing a burst error of a signal.

In addition, further, when a quantity of UEs is determined, and a quantity of VRBs corresponding to each UE is determined, a larger diversity order of same UE indicates a smaller maximum consecutive resource block quantity and a greater minimum frequency hopping distance of the same UE. For data transmission of each UE, more even resource allocation indicates greater reduction of impact of channel fading on the data transmission of each UE.

In the embodiment shown in FIG. 5 (including FIG. 5a, FIG. 5b, and FIG. 5c), a quantity of FHVRBs corresponding to each UE is less than half of a quantity M of to-be-allocated PRBs. Therefore, there is no such case in which two consecutive PRBs are used for same UE. The following describes in detail with reference to FIG. 7a and FIG. 7b a case in which UE corresponds to a relatively large quantity of FHVRBs.

FIG. 7a and FIG. 7b are schematic diagrams showing that a base station allocates a resource to first UE and second UE respectively according to still another embodiment of the present invention. A quantity M of PRBs that can be used for data transmission is 18, and a mapping relationship between FHVRBs and PRBs is shown in FIG. 4. A quantity N of first FHVRBs corresponding to the first UE is 13. A quantity S of second FHVRBs corresponding to the second UE is three.

FIG. 7a is a schematic diagram showing that a base station allocates a resource to first UE according to still another embodiment of the present invention. As shown in FIG. 7a, first, the base station determines a location of a first first PRB corresponding to a first first VRB. For example, a first PRB (namely, a PRB whose PRB sequence number is 0) of the 18 PRBs is used as the first first PRB.

Subsequently, it is determined that a first step corresponding to the first UE is 18/13=1.38.

Subsequently, locations are determined based on the first step for 12 first PRBs corresponding to remaining 12 first VRBs. According to the foregoing method for determining a PRB for UE by a base station, it can be determined that a PRB sequence number of a second first PRB in the 18 PRBs is [1.38]=1; a PRB sequence number of a third first PRB in the 18 PRBs is [1.38*2]=3; a PRB sequence number of a fourth first PRB in the 18 PRBs is [1.38*3]=4; a PRB sequence number of a fifth first PRB in the 18 PRBs is [1.38*4]=6; a PRB sequence number of a sixth first PRB in the 18 PRBs is [1.38*5]=7; a PRB sequence number of a seventh first PRB in the 18 PRBs is [1.38*6]=8; a PRB sequence number of an eighth first PRB in the 18 PRBs is [1.38*7]=10; a PRB sequence number of a ninth first PRB in the 18 PRBs is [1.38*8]=11; a PRB sequence number of a tenth first PRB in the 18 PRBs is [1.38*9]=12; a PRB sequence number of an eleventh first PRB in the 18 PRBs is [1.38*10]=14; a PRB sequence number of a twelfth first PRB in the 18 PRBs is [1.38*11]=15; and a PRB sequence number of a thirteenth first PRB in the 18 PRBs is [1.38*12]=17.

It should be noted that, the first VRB herein may be an FHVRB on which frequency hopping processing is performed, or a VRB on which no frequency hopping processing is performed. In other words, the frequency hopping processing may be performed on the first VRB after the first PRB is determined, or before the first PRB is performed, or when the first PRB is being performed. This is not limited in the present invention.

Referring to FIG. 4 again, FHVRB sequence numbers of first FHVRBs for carrying to-be-transmitted data of the first UE may be determined based on a mapping relationship between FHVRBs and PRBs, and to be specific, are FHVRB sequence numbers of FHVRBs respectively corresponding to PRB sequence numbers 0, 1, 3, 4, 6, 7, 8, 10, 11, 12, 14, 15, and 17. It can be determined from FIG. 4 that VRB sequence numbers of the first FHVRBs are: 0, 9, 10, 2, 3, 12, 4, 5, 14, 6, 7, 16, and 17.

FIG. 7b is a schematic diagram showing that a base station allocates a resource to second UE according to still another embodiment of the present invention. As shown in FIG. 7b, the base station first renumbers remaining five PRBs. It can be learned from the figure that the numbers are sequentially 0, 1, 2, 3, and 4 from left to right.

Subsequently, a location is determined for a last second PRB corresponding to a last second VRB. For example, a last PRB (namely, a PRB whose PRB sequence number is 4 in the remaining five PRBs) of the remaining five PRBs is used as the last second PRB.

Subsequently, it is determined that a second step corresponding to the second UE is 5/3=1.67.

Subsequently, locations are determined based on the second step for two second PRBs corresponding to remaining two second VRBs. According to the foregoing method for determining a PRB for UE by a base station, it can be determined that a PRB sequence number of a second second PRB in the five PRBs is 4−[1.67]=2, and a PRB sequence number of a first second PRB in the five PRBs is 4−[1.67*2]=1.

It should be noted that, the second VRB herein may be an FHVRB on which frequency hopping processing is performed, or a VRB on which no frequency hopping processing is performed. In other words, the frequency hopping processing may be performed on the second VRB after the second PRB is determined, or before the second PRB is performed, or when the second PRB is being performed. This is not limited in the present invention.

Referring to FIG. 4 again, FHVRB sequence numbers of second FHVRBs for carrying to-be-transmitted data of the second UE may be determined based on a mapping relationship between FHVRBs and PRBs, and to be specific, are FHVRB sequence numbers of FHVRBs respectively corresponding to PRB sequence numbers 4, 2, and 1. It may be determined from FIG. 4 that VRB sequence numbers of the second VRBs are: 8, 13, and 11.

In this way, locations that are of the first PRBs and the second PRBs in the M PRBs and that are allocated by the base station to the first UE and the second UE, and the FHVRB sequence numbers corresponding to the first FHVRBs and the second FHVRBs may be determined. It can be learned from FIG. 7b that the first PRBs and the second PRBs are evenly allocated in the M PRBs. However, because there is a relatively large quantity of first FHVRBs, greater than M/2, a case in which two or more PRBs are consecutive definitely occurs. Even so, because the minimum frequency hopping distance is considered during the mapping between the FHVRBs and the PRBs, a difference between sequence numbers of VRBs carried on two consecutive PRBs is greater than or equal to the minimum frequency hopping distance. In other words, the VRBs carried on the two consecutive PRBs are discontinuous. In other words, even if FHVRBs carried on the two consecutive PRBs are FHVRBs of same UE, data carried by the two consecutive PRBs is discontinuous.

It should be understood that, a sequence in which the frequency hopping processing is performed on the VRBs (for example, the first VRB and the second VRB) and the PRBs (for example, the first PRB and the second PRB) are determined is not specified in the present invention. In addition, a sequence of performing the frequency hopping processing on VRBs of a plurality of UEs and determining PRBs corresponding to the UEs is not particularly specified in the present invention.

Further, the first FHVRB is an FHVRB transmitted by the first UE within a first time unit, and the second FHVRB is an FHVRB transmitted by the second UE within the first time unit. A cyclic shift is performed on the first FHVRB and the second FHVRB, so that a fourth FHVRB corresponding to the first UE and a fifth FHVRB corresponding to the second UE within a second time unit can be obtained.

FIG. 8 is a schematic diagram of a cyclic shift according to still another embodiment of the present invention. For ease of understanding and description, FHVRB sequence numbers of FHVRBs corresponding to 18 PRBs are marked on the corresponding PRBs. As shown in FIG. 8, FHVRB sequence numbers of FHVRBs corresponding to the 18 PRBs in a first timeslot are shown in FIG. 4. In a second timeslot, the FHVRBs are cyclically shifted to the left by one PRB, to achieve a resource usage status shown in FIG. 8. It can be learned that in different physical subbands and different timeslots, at least one PRB is occupied by an FHVRB carrying data. It should be understood that a displacement amount of the cyclic shift may be one PRB or may be two PRBs, and a direction of the cyclic shift may be a first direction or a second direction. This is not limited in the present invention.

Three indexes, namely, a diversity order, a maximum consecutive resource block quantity, and a minimum frequency hopping distance are determined with reference to FIG. 8 below.

First, the diversity order is determined. As shown in FIG. 8, in the first timeslot, FHVRB sequence numbers corresponding to 13 first FHVRBs corresponding to first UE are: 0, 1, 3, 4, 6, 7, 8, 10, 11, 12, 14, 15, and 17; and FHVRB sequence numbers corresponding to three second FHVRBs corresponding to second UE are: 8, 13, and 11. It can be learned that, after being cyclically shifted by one PRB, VRBs (including the first FHVRBs and fourth FHVRBs) corresponding to the first UE occupy a total of 18 PRBs in the first timeslot and the second timeslot; and FHVRBs (including the second FHVRBs and fifth FHVRBs) corresponding to the second UE occupy a total of six PRBs in the first timeslot and the second timeslot. To be specific, a diversity order of the first UE is 18, and a diversity order of the second UE is 6.

It can be found through comparison with the embodiment shown in FIG. 6 that, when a quantity N of FHVRBs corresponding to UE is less than half of a total quantity M of PRBs that can be used for transmission (namely, N<M/2), a diversity order of the UE is 2N. When the quantity N of the FHVRBs corresponding to the UE is greater than or equal to half of the total quantity M of the PRBs that can be used for transmission (namely, N≥M/2), the diversity order of the UE is M.

Subsequently, the maximum consecutive resource block quantity is determined. As shown in FIG. 8, in the first timeslot, first PRBs corresponding to the 13 first FHVRBs corresponding to the first UE are discontinuous in the 18 PRBs, and second PRBs corresponding to the three second FHVRBs corresponding to the second UE are also discontinuous in the 18 PRBs. To be specific, in the first timeslot, a maximum consecutive resource block quantity of the first UE is three, and a maximum consecutive resource block quantity of the second UE is one. To be specific, in the second timeslot, the maximum consecutive resource block quantity of the first UE is also three, and the maximum consecutive resource block quantity of the second UE is also one.

Subsequently, the minimum frequency hopping distance is determined. It can be learned that a minimum frequency hopping distance of FHVRBs carried on PRBs shown in FIG. 8 is 8. Therefore, for the first UE, even if the maximum consecutive resource block quantity is three, because the data carried on the consecutive PRBs is discontinuous, impact of channel fading in a frequency band on data carried on a plurality of consecutive PRBs can still be mitigated to some extent.

It can be learned by determining the foregoing three indexes that, according to the method for data transmission in the embodiments of the present invention, data of a plurality of UEs can be evenly allocated to a physical resource, so that a correlation of data carried on consecutive PRBs is weakened, thereby dispersing channel fading into the data of the UEs, and discretizing a burst error of a signal.

Therefore, according to the method for data transmission in the embodiments of the present invention, VRBs are allocated based on UEs, a step of corresponding PRBs is determined based on a quantity of the VRBs, and locations of the corresponding PRBs in a physical resource are determined based on the step. In this way, data of the UEs can be evenly dispersed into the given physical resource, so that each UE corresponds to a minimum quantity of consecutive resource blocks, thereby reducing impact of channel fading on data transmission. In addition, a pattern of a mapping between VRBs and PRBs is determined based on the minimum frequency hopping distance, so that a correlation of the data carried on the consecutive PRBs is weakened, thereby also mitigating the impact of channel fading on data transmission. In addition, the cyclic shift is performed to increase a diversity order of a same user. This is more advantageous to a diversity gain.

FIG. 9 is a schematic flowchart of a method for data transmission 200 according to yet another embodiment of the present invention. The method shown in FIG. 9 may be performed by a base station or a network device. This is not particularly limited in the present invention. It should be understood that FIG. 9 shows detailed communication steps or operations of the method for data transmission according to yet another embodiment of the present invention from a perspective of the base station. However, these steps or operations are merely examples. Other operations or variations of various operations in FIG. 9 may further be performed in this embodiment of the present invention. In addition, the steps in FIG. 9 may be performed in an order different from that presented in FIG. 9, and the operations in FIG. 9 may not necessarily be all performed.

As shown in FIG. 9, the method 200 includes the following steps.

S210. Determine a mapping relationship between L VRBs and M PRBs based on a preset minimum frequency hopping distance. The mapping relationship is used to indicate a location of each of the L VRBs in the M PRBs. The minimum frequency hopping distance is specifically a difference between VRB sequence numbers corresponding to any two consecutive PRB sequence numbers. The minimum frequency hopping distance is used to indicate a distance between virtual subbands used by VRBs corresponding to any two consecutive PRBs. M is a quantity of PRBs that can be used for data transmission. L is a quantity of VRBs used for data transmission. The M PRBs correspond to M physical subbands used for data transmission. The L VRBs correspond to L virtual subbands used for data transmission.

S220. Determine N first PRBs corresponding to first user equipment UE. The N first PRBs correspond to N physical subbands for carrying to-be-transmitted data of the first UE. N is a natural number greater than or equal to 1.

S230. Determine, based on the mapping relationship and the N first PRBs, N first VRBs corresponding to the N first PRBs. The N first VRBs correspond to N virtual subbands for carrying the to-be-transmitted data.

Specifically, before allocating resources to UEs, or when allocating resources to UEs, the base station may perform frequency hopping processing on VRBs, to be specific, map the VRBs to PRBs based on the preset minimum frequency hopping distance, so that a distance between virtual subbands corresponding to VRBs carried on two adjacent PRBs is greater than or equal to the minimum frequency hopping distance. A VRB on which the frequency hopping processing is performed is referred to as a frequency hopping VRB.

Therefore, according to the method for data transmission in this embodiment of the present invention, the frequency hopping processing is performed on the VRBs, so that a correlation between data carried on adjacent PRBs is weakened, and impact of channel weakening on data transmission can be dispersed into two non-adjacent data segments to become random error codes. In this way, a burst error of a signal is discretized, to further help a system perform error correction processing on scattered single error codes, thereby further improving a transmission success rate.

It should be understood that, specific methods for performing the frequency hopping processing on the VRBs by the base station and determining the N first VRBs based on the N first PRBs are described in detail in the embodiments corresponding to FIG. 3 to FIG. 8. For brevity, details are not described herein again.

The method for data transmission according to the embodiments of the present invention is described in detail above with reference to FIG. 1 to FIG. 9. The following describes in detail an apparatus for data transmission according to the embodiments of the present invention with reference to FIG. 10 and FIG. 11.

Figure 10:
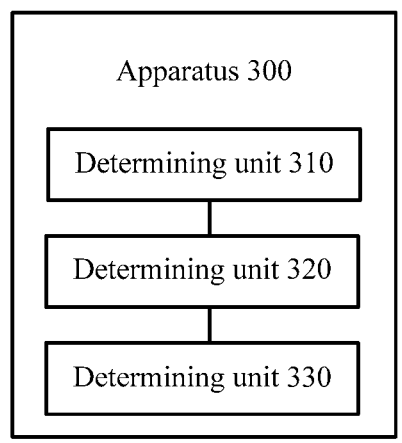
FIG. 10 is a schematic block diagram of an apparatus for data transmission according to an embodiment of the present invention.

FIG. 10 is a schematic block diagram of an apparatus 300 for data transmission according to an embodiment of the present invention. As shown in FIG. 10, the apparatus 300 includes a first determining unit 310, a second determining unit 320, and a third determining unit 330.

The first determining unit 310 is configured to determine a quantity N of first virtual resource blocks VRBs corresponding to first user equipment UE. The N first VRBs correspond to N virtual subbands for carrying to-be-transmitted data of the first UE. N is a natural number greater than or equal to 1.

The second determining unit 320 is configured to determine, based on the quantity N of the first VRBs, a first step corresponding to the N first VRBs. The first step is used to indicate a distance between two adjacent physical subbands to which the N first VRBs are mapped in a physical resource. The first step is greater than 1.

The third determining unit 330 is configured to determine, based on the first step, N first PRBs corresponding to the N first VRBs. The N first PRBs correspond to N physical subbands for carrying the to-be-transmitted data.

The apparatus 300 for data transmission according to this embodiment of the present invention may correspond to the base station in the method for data transmission according to the embodiments of the present invention, and the modules in the apparatus 300 and other operations and/or functions are respectively for implementing corresponding processes in the method in FIG. 1. For brevity, details are not described herein again.

Therefore, according to the apparatus for data transmission in this embodiment of the present invention, a first step of a corresponding first PRB in the physical resource is determined based on the quantity of the first VRBs corresponding to the first UE, and the first step is greater than 1. Further, first PRBs for carrying the to-be-transmitted data are determined, so that there are at least two adjacent first PRBs, whose distance is greater than 1, mapped in the physical resource, thereby dispersing the to-be-transmitted data of the first UE into the physical resource, to reduce impact of channel fading on data transmission and improve a transmission success rate.

Figure 11:
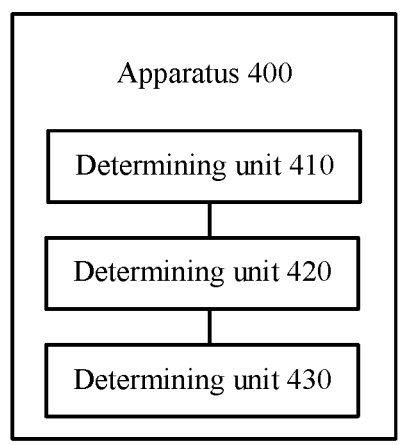
FIG. 11 is a schematic block diagram of an apparatus for data transmission according to another embodiment of the present invention.

FIG. 11 is a schematic block diagram of an apparatus 400 for data transmission according to another embodiment of the present invention. As shown in FIG. 11, the apparatus 400 includes a first determining unit 410, a second determining unit 420, and a third determining unit 430.

The first determining unit 410 is configured to determine a mapping relationship between L virtual resource blocks VRBs and M physical resource blocks PRBs based on a preset minimum frequency hopping distance. The mapping relationship is used to indicate a location of each of the L VRBs in the M PRBs. The minimum frequency hopping distance is specifically a difference between VRB sequence numbers corresponding to any two consecutive PRB sequence numbers. The minimum frequency hopping distance is used to indicate a distance between virtual subbands used by VRBs corresponding to any two consecutive PRBs. M is a quantity of PRBs that can be used for data transmission. L is a quantity of VRBs used for data transmission. The L VRBs correspond to L virtual subbands used for data transmission. The M PRBs correspond to M physical subbands used for data transmission.

The second determining unit 420 is configured to determine N first PRBs corresponding to first user equipment UE. The N first PRBs correspond to N physical subbands for carrying to-be-transmitted data of the first UE. N is a natural number greater than or equal to 1.

The third determining unit 430 is configured to determine, based on the mapping relationship and the N first PRBs, N first VRBs corresponding to the N first PRBs. The N first VRBs correspond to N virtual subbands for carrying the to-be-transmitted data.

The apparatus 400 for data transmission according to this embodiment of the present invention may correspond to the base station in the method for data transmission according to the embodiments of the present invention, and the modules in the apparatus 400 and other operations and/or functions are respectively for implementing corresponding processes in the method in FIG. 9. For brevity, details are not described herein again.

Therefore, according to the apparatus for data transmission in this embodiment of the present invention, the frequency hopping processing is performed on the VRBs, so that a correlation between data carried on adjacent PRBs is weakened, and impact of channel weakening on data transmission can be dispersed into two non-adjacent data segments to become random error codes. In this way, a burst error of a signal is discretized, to further help a system perform error correction processing on scattered single error codes, thereby further improving a transmission success rate.

The apparatus for data transmission according to the embodiments of the present invention is described in detail above with reference to FIG. 10 and FIG. 11. The following describes in detail a device for data transmission according to the embodiments of the present invention with reference to FIG. 12 and FIG. 13.

Figure 12:
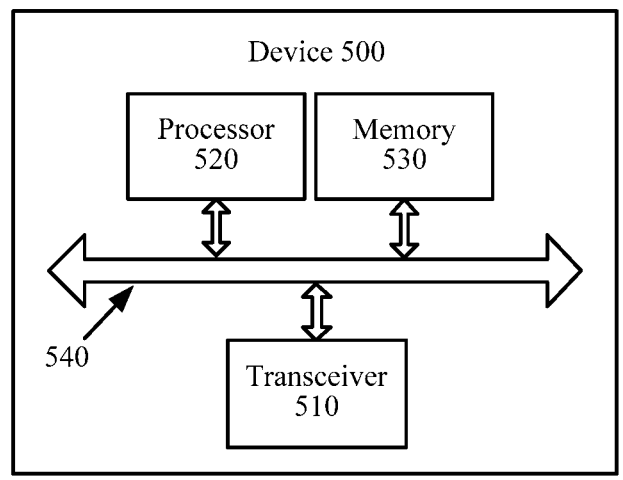
FIG. 12 is a schematic block diagram of a device for data transmission according to an embodiment of the present invention.

FIG. 12 is a schematic block diagram of a device 500 for data transmission according to an embodiment of the present invention. As shown in FIG. 12, the device 500 includes a transceiver 510, a processor 520, a memory 530, and a bus system 540. The transceiver 510, the processor 520, and the memory 530 are connected to each other by using the bus system 540. The memory 530 is configured to store an instruction. The processor 520 is configured to execute the instruction stored in the memory 530, to control the transceiver 510 to receive or send a signal.

The processor 520 is configured to determine a quantity N of first virtual resource blocks VRBs corresponding to first user equipment UE. The N first VRBs correspond to N virtual subbands for carrying to-be-transmitted data of the first UE. N is a natural number greater than or equal to 1.

The processor 520 is further configured to determine, based on the quantity N of the first VRBs, a first step corresponding to the N first VRBs. The first step is used to indicate a distance between two adjacent physical subbands to which the N first VRBs are mapped in a physical resource.

The processor 520 is further configured to determine, based on the first step, N first PRBs corresponding to the N first VRBs. The N first PRBs correspond to N physical subbands for carrying the to-be-transmitted data.

It should be understood that in this embodiment of the present invention, the processor 520 may be a central processing unit (central processing unit, "CPU" for short), or the processor 520 may be another general purpose processor, a digital signal processor (DSP), an application-specific integrated circuit (ASIC), a field programmable gate array (FPGA) or another programmable logical device, a discrete gate or a transistor logical device, a discrete hardware component, or the like. The general purpose processor may be a microprocessor, or the processor may be any conventional processor or the like.

The processor 520 may include a read-only memory and a random access memory, and provides an instruction and data to the processor 520. A part of the processor 520 may further include a non-volatile random access memory. For example, the processor 520 may further store device-type information.

The bus system 540 may further include a power bus, a control bus, a status signal bus, and the like, in addition to a data bus. However, for clear description, various types of buses in the figure are marked as the bus system 540.

In an implementation process, steps in the foregoing methods can be implemented by using a hardware integrated logical circuit in the processor 520, or by using instructions in a form of software. The steps of the positioning method disclosed with reference to the embodiments of the present invention may be directly performed and completed by using a hardware processor, or may be performed and completed by using a combination of hardware and software modules in the processor. A software module may be located in a mature storage medium in the art, such as a random access memory, a flash memory, a read-only memory, a programmable read-only memory, an electrically erasable programmable memory, or a register. The storage medium is located in the memory 530, and the processor 520 reads information in the memory 530 and completes the steps in the foregoing methods in combination with hardware of the processor. To avoid repetition, details are not described herein again.

The device 500 for data transmission according to this embodiment of the present invention may correspond to the base station in the method for data transmission according to the embodiments of the present invention, and the modules in the device 500 and other operations and/or functions are respectively for implementing corresponding processes in the method in FIG. 1. For brevity, details are not described herein again.

Therefore, according to the device for data transmission in this embodiment of the present invention, a first step of a corresponding first PRB in the physical resource is determined based on the quantity of the first VRBs corresponding to the first UE, and the first step is greater than 1. Further, first PRBs for carrying the to-be-transmitted data are determined, so that there are at least two adjacent first PRBs, whose distance is greater than 1, mapped in the physical resource, thereby dispersing the to-be-transmitted data of the first UE into the physical resource, to reduce impact of channel fading on data transmission and improve a transmission success rate.

Figure 13:
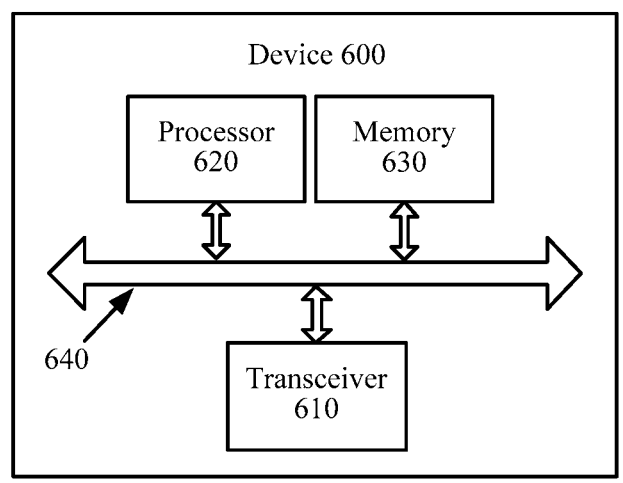
FIG. 13 is a schematic block diagram of a device for data transmission according to another embodiment of the present invention.

FIG. 13 is a schematic block diagram of a device 600 for data transmission according to another embodiment of the present invention. As shown in FIG. 13, the device 600 includes a transceiver 610, a processor 620, a memory 630, and a bus system 640. The transceiver 610, the processor 620, and the memory 630 are connected to each other by using the bus system 640. The memory 630 is configured to store an instruction. The processor 620 is configured to execute the instruction stored in the memory 630, to control the transceiver 610 to receive or send a signal.

The processor 620 is configured to determine a mapping relationship between L virtual resource blocks VRBs and M physical resource blocks PRBs based on a preset minimum frequency hopping distance. The mapping relationship is used to indicate a location of each of the L VRBs in the M PRBs. The minimum frequency hopping distance is specifically a difference between VRB sequence numbers corresponding to any two consecutive PRB sequence numbers. The minimum frequency hopping distance is used to indicate a distance between virtual subbands used by VRBs corresponding to any two consecutive PRBs. M is a quantity of PRBs that can be used for data transmission. L is a quantity of VRBs used for data transmission. The L VRBs correspond to L virtual subbands used for data transmission. The M PRBs correspond to M physical subbands used for data transmission.

The processor 620 is further configured to determine N first PRBs corresponding to first user equipment UE. The N first PRBs correspond to N physical subbands for carrying to-be-transmitted data of the first UE. N is a natural number greater than or equal to 1.

The processor 620 is further configured to determine, based on the mapping relationship and the N first PRBs, N first VRBs corresponding to the N first PRBs. The N first VRBs correspond to N virtual subbands for carrying the to-be-transmitted data.

The device 600 for data transmission according to this embodiment of the present invention may correspond to the base station in the method for data transmission according to the embodiments of the present invention, and the modules in the device 600 and other operations and/or functions are respectively for implementing corresponding processes in the method in FIG. 9. For brevity, details are not described herein again.

Therefore, according to the device for data transmission in this embodiment of the present invention, the frequency hopping processing is performed on the VRBs, so that a correlation between data carried on adjacent PRBs is weakened, and impact of channel weakening on data transmission can be dispersed into two non-adjacent data segments to become random error codes. In this way, a burst error of a signal is discretized, to further help a system perform error correction processing on scattered single error codes, thereby further improving a transmission success rate.

It should be understood that sequence numbers of the foregoing processes do not mean execution sequences in the embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for data transmission, comprising:
   determining a quantity N of first virtual resource blocks (VRB)s corresponding to first user equipment (UE), wherein the N first VRBs correspond to N virtual subbands for carrying to-be-transmitted data of the first UE, and N is a natural number greater than or equal to 1;
   determining, based on the quantity N of the first VRBs, a first step corresponding to the N first VRBs, wherein the first step indicates a distance between two adjacent physical subbands to which the N first VRBs are mapped in a physical resource, and the first step is greater than 1; and
   determining, based on the first step, N first Physical Resource Blocks (PRB)s corresponding to the N first VRBs, wherein the N first PRBs correspond to N physical subbands for carrying the to-be-transmitted data.

2. The method according to claim 1, wherein the determining, based on the quantity N of the first VRBs, a first step corresponding to the N first VRBs comprises:
   determining M PRBs that are used for data transmission, wherein M is a natural number greater than or equal to N, the M PRBs correspond to M PRB sequence numbers, the M PRB sequence numbers are sequentially arranged in an order from 0 to M−1 based on a step of 1, and the M PRB sequence numbers consecutively indicates M physical subbands used by the M PRBs; and
   performing one of the following operations:
      determining the first step based on a PRB sequence number of a PRB corresponding to a first first PRB in the N first PRBs and the quantity N of the first VRBs; or
      determining the first step based on a PRB sequence number of a PRB corresponding to a last first PRB in the N first PRBs and the quantity N of the first VRBs, wherein
      the N first PRBs correspond to the N first VRBs.

3. The method according to claim 2, wherein the determining the first step based on a PRB sequence number of a PRB corresponding to a first first PRB in the N first PRBs and the quantity N of the first VRBs comprises:
   determining that a PRB whose PRB sequence number is m in the M PRBs is the first first PRB in the N first PRBs, wherein m is a natural number greater than or equal to M−N; and
   determining, based on m and N, that a value range of the first step $W_1$ is $[1, (M-1-m)/(N-1)]$.

4. The method according to claim 3, wherein the determining, based on the first step, N first PRBs corresponding to the N first VRBs comprises:
   determining that a PRB sequence number of a PRB corresponding to an $i^{th}$ first PRB in the M PRBs is $N_i = m + [W_1*(i-1)]$, wherein [ ] represents a rounding operation, and $i \in [1, N]$.

5. The method according to claim 2, wherein the determining the first step based on a PRB sequence number of a PRB corresponding to a last first PRB in the N first PRBs and the quantity N of the first VRBs comprises:
   determining that a PRB whose PRB sequence number is n in the M PRBs is the last first PRB in the N first PRBs, wherein n is a natural number greater than or equal to N; and
   determining, based on n and N, that a value range of the first step $W_1$ is $[1, n/(N-1)]$.

6. The method according to claim 5, wherein the determining, based on the first step, N first PRBs corresponding to the N first VRBs comprises:
   determining that a PRB sequence number of a PRB corresponding to an $i^{th}$ first PRB in the M PRBs is $N_i = n - [W_1*(i-1)]$, wherein [ ] represents a rounding operation, and $i \in [1, N]$.

7. The method according to claim 1, wherein the method further comprises:
   determining a quantity S of second VRBs corresponding to second UE, wherein the S second VRBs correspond to S virtual subbands for carrying to-be-transmitted data of the second UE, S is a natural number greater than or equal to 1, and a sum of S and N is less than or equal to M;
   renumbering M−N PRBs other than the N first PRBs in the M PRBs, wherein the M−N PRBs correspond to M−N PRB sequence numbers, and the M−N PRB sequence numbers are sequentially arranged in an order from 0 to M−N−1 based on a step of 1;
   determining a second step corresponding to the S second VRBs, wherein the second step is indicates a distance between two adjacent physical subbands to which the S second VRBs are mapped in the physical resource, and the second step is greater than 1; and
   determining, based on the second step, a PRB sequence number of a PRB corresponding to the S second PRBs in the M−N PRBs.

8. The method according to claim 1, wherein the determining a quantity N of first VRBs corresponding to first UE comprises:
   determining a quantity of VRBs corresponding to each of a plurality of UEs;
   determining the first UE from the plurality of UEs, wherein the first UE is UE having a largest quantity of VRBs in the plurality of UEs; and
   determining the quantity N of VRBs corresponding to the first UE.

9. The method according to claim 1, wherein the method further comprises:
   determining a mapping relationship between L VRBs and the M PRBs based on a preset minimum frequency hopping distance, wherein the mapping relationship indicates a location of each of the L VRBs in the M PRBs, the minimum frequency hopping distance is a difference between VRB sequence numbers corresponding to any two consecutive PRB sequence numbers, the minimum frequency hopping distance indicates a distance between virtual subbands used by VRBs corresponding to any two consecutive PRBs, M is a quantity of PRBs that are used for data transmission, and L is a quantity of VRBs used for data transmission; and
   determining, based on the mapping relationship, VRB sequence numbers of the N first VRBs corresponding to PRB sequence numbers of the N first PRBs.

10. The method according to claim 9, wherein the minimum frequency hopping distance is set as follows:
    when L is an odd number, the minimum frequency hopping distance is (L−1)/2; or
    when L is an even number, the minimum frequency hopping distance is L/2−1.

11. The method according to claim 9, wherein L PRBs corresponding to the L VRBs are consecutively arranged in the M PRBs, and L VRB sequence numbers corresponding to the L VRBs are arranged in an order from 0 to L−1 in the M PRBs as follows:
    when L is an odd number, the VRB sequence numbers of the L VRBs are sequentially arranged in an order from 0 to (L−1)/2 based on a step of 1 at locations at which the PRB sequence numbers are even numbers, and sequentially arranged in an order from (L+1)/2 to L based on a step of 1 at locations at which the PRB sequence numbers are odd numbers; or
    when L is an even number, the VRB sequence numbers of the L VRBs are sequentially arranged in an order from 0 to L/2−1 based on a step of 1 at locations at which the PRB sequence numbers are even numbers, and sequentially arranged in an order from L/2 to L based on a step of 1 at locations at which the PRB sequence numbers are odd numbers.

12. The method according to claim 1, wherein the first VRB is a VRB transmitted by the first UE within a first time unit, and the method further comprises:
    determining N fourth VRBs corresponding to the first UE that are used for transmission within a second time unit, wherein the N fourth VRBs are obtained by performing a cyclic shift on the N first VRBs, and the second time unit is a next time unit of the first time unit.

13. An apparatus for data transmission, comprising:
    a non-transitory memory storage comprising instructions; and
    one or more hardware processors in communication with the non-transitory memory storage, wherein the one or more hardware processors execute the instructions to:
       determine a quantity N of first virtual resource blocks VRBs corresponding to first user equipment UE, wherein the N first VRBs correspond to N virtual subbands for carrying to-be-transmitted data of the first UE, and N is a natural number greater than or equal to 1;
       determine, based on the quantity N of the first VRBs, a first step corresponding to the N first VRBs, wherein the first step indicates a distance between two adjacent physical subbands to which the N first VRBs are mapped in a physical resource, and the first step is greater than 1; and
       determine, based on the first step, N first Physical Resource Blocks (PRB)s corresponding to the N first VRBs, wherein the N first PRBs correspond to N physical subbands for carrying the to-be-transmitted data.

14. The apparatus according to claim 13, wherein the one or more hardware processors further execute the instructions to:
    determine M PRBs that are used for data transmission, wherein M is a natural number greater than or equal to N, the M PRBs correspond to M PRB sequence numbers, the M PRB sequence numbers are sequentially arranged in an order from 0 to M−1 based on a step of 1, and the M PRB sequence numbers are consecutively indicates M physical subbands used by the M PRBs; and perform one of the following operations:
determine the first step based on a PRB sequence number of a PRB corresponding to a first first PRB in the N first PRBs and the quantity N of the first VRBs; or
determine the first step based on a PRB sequence number of a PRB corresponding to a last first PRB in the N first PRBs and the quantity N of the first VRBs, wherein
the N first PRBs correspond to the N first VRBs.

15. The apparatus according to claim 14, wherein the one or more hardware processors further execute the instructions to:
determine that a PRB whose PRB sequence number is m in the M PRBs is the first first PRB in the N first PRBs, wherein m is a natural number greater than or equal to M−N; and
determine, based on m and N, that a value range of the first step $W_1$ is $[1, (M−1−m)/(N−1)]$.

16. The apparatus according to claim 15, wherein the one or more hardware processors further execute the instructions to:
determine that a PRB sequence number of a PRB corresponding to an $i^{th}$ first PRB in the M PRBs is $N_i=m+[W_1*(i−1)]$, wherein [ ] represents a rounding operation, and $i \in [1, N]$.

17. The apparatus according to claim 14, wherein the one or more hardware processors further execute the instructions to:
determine that a PRB whose PRB sequence number is n in the M PRBs is the last first PRB in the N first PRBs, wherein n is a natural number greater than or equal to N; and
determine, based on n and N, that a value range of the first step $W_1$ is $[1, n/(N−1)]$.

18. The apparatus according to claim 17, wherein the one or more hardware processors further execute the instructions to:
determine that a PRB sequence number of a PRB corresponding to an $i^{th}$ first PRB in the M PRBs is $N_i=n−[W_1*(i−1)]$, wherein [ ] represents a rounding operation, and $i \in [1, N]$.

19. The apparatus according to claim 13, wherein the one or more hardware processors further execute the instructions to:
determine a quantity S of second VRBs corresponding to second UE, wherein the S second VRBs correspond to S virtual subbands for carrying to-be-transmitted data of the second UE;
renumber M−N PRBs other than the N first PRBs in the M PRBs, wherein the M−N PRBs correspond to M−N PRB sequence numbers, and the M−N PRB sequence numbers are sequentially arranged in an order from 0 to M−N−1 based on a step of 1;
determine a second step corresponding to the S second VRBs, wherein the second step indicates a distance between two adjacent physical subbands to which the S second VRBs are mapped in the physical resource, and the second step is greater than 1; and
determine, based on the second step, a PRB sequence number of a PRB corresponding to the S second PRBs in the M−N PRBs, wherein S is a natural number greater than or equal to 1, and a sum of S and N is less than or equal to M.

20. The apparatus according to claim 13, wherein the one or more hardware processors further execute the instructions to:
determine a quantity of VRBs corresponding to each of a plurality of UEs; and
determine the first UE from the plurality of UEs, wherein the first UE is UE having a largest quantity of VRBs in the plurality of UEs.

* * * * *